US011910176B2

(12) United States Patent
Borss et al.

(10) Patent No.: US 11,910,176 B2
(45) **Date of Patent: *Feb. 20, 2024**

(54) APPARATUS AND METHOD FOR LOW DELAY OBJECT METADATA CODING

(71) Applicant: Fraunhofer-Gesellschaft zur Foerderung der angewandten Forschung e.V., Munich (DE)

(72) Inventors: Christian Borss, Erlangen (DE); Christian Ertel, Eckental (DE); Johannes Hilpert, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,804

(22) Filed: Apr. 25, 2022

(65) Prior Publication Data

US 2022/0329958 A1 Oct. 13, 2022

Related U.S. Application Data

(63) Continuation of application No. 16/810,538, filed on Mar. 5, 2020, now Pat. No. 11,337,019, which is a (Continued)

(30) Foreign Application Priority Data

Jul. 22, 2013 (EP) .................................... 13177365
Jul. 22, 2013 (EP) .................................... 13177367
(Continued)

(51) Int. Cl.
*H04S 5/00* (2006.01)
*G10L 19/008* (2013.01)
(Continued)

(52) U.S. Cl.
CPC ............ *H04S 5/005* (2013.01); *G10L 19/008* (2013.01); *H04S 3/008* (2013.01); *H04S 3/02* (2013.01);
(Continued)

(58) Field of Classification Search
CPC ........ H04S 3/02; H04S 2420/03; H04S 3/008; H04S 2400/03; H04S 5/005; H04S 2400/11; G10L 19/008
(Continued)

(56) References Cited

U.S. PATENT DOCUMENTS 2,605,361 A 7/1952 Cutler
7,979,282 B2 7/2011 Kim et al.
(Continued)

FOREIGN PATENT DOCUMENTS

AU 2009206856 A1 7/2009
CN 1969317 A 5/2007
(Continued)

OTHER PUBLICATIONS

First Office Action for Chinese Application No. 202011323152.7 dated Dec. 3, 2021. 9 pages with English translation.
(Continued)

*Primary Examiner* — Paul Kim
(74) *Attorney, Agent, or Firm* — Perkins Cole LLP; Michael A. Glenn

(57) ABSTRACT

An apparatus for generating one or more audio channels. The apparatus comprises a metadata decoder for generating one or more reconstructed metadata signals from one or more processed metadata signals depending on a control signal, wherein each of the one or more reconstructed metadata signals indicates information associated with an audio signal of one or more audio signals, wherein the metadata decoder is configured to generate the one or more
(Continued)

reconstructed metadata signals by determining a plurality of reconstructed metadata samples for each of the one or more reconstructed metadata signals. Moreover, the apparatus comprises an audio channel generator for generating the one or more audio channels depending on the one or more audio signals and depending on the one or more reconstructed metadata signals.

14 Claims, 17 Drawing Sheets

Related U.S. Application Data continuation of application No. 16/360,776, filed on Mar. 21, 2019, now Pat. No. 10,659,900, which is a continuation of application No. 15/695,791, filed on Sep. 5, 2017, now Pat. No. 10,277,998, which is a continuation of application No. 15/002,127, filed on Jan. 20, 2016, now Pat. No. 9,788,136, which is a continuation of application No. PCT/EP2014/065283, filed on Jul. 16, 2014.

(30) Foreign Application Priority Data

Jul. 22, 2013 (EP) .................................... 13177378
Oct. 18, 2013 (EP) .................................... 13189279

(51) Int. Cl.
*H04S 3/00* (2006.01)
*H04S 3/02* (2006.01)

(52) U.S. Cl.
CPC ....... *H04S 2400/03* (2013.01); *H04S 2400/11* (2013.01); *H04S 2420/03* (2013.01)

(58) Field of Classification Search
USPC ...................................................... 381/23, 22
See application file for complete search history.

(56) References Cited

U.S. PATENT DOCUMENTS 8,255,212 B2 8/2012 Villemoes
8,417,531 B2 4/2013 Kim et al.
8,504,184 B2 8/2013 Ishikawa et al.
8,504,377 B2 8/2013 Oh et al.
8,798,776 B2 8/2014 Schildbach et al.
8,824,688 B2 9/2014 Schreiner et al.
9,167,346 B2 10/2015 Kraemer et al.
9,530,421 B2 12/2016 Jot et al.
9,788,136 B2 * 10/2017 Borss ...................... H04S 5/005
2004/0028125 A1 2/2004 Sato
2006/0083385 A1 4/2006 Allamanche et al.
2006/0136229 A1 6/2006 Kjoerling et al.
2006/0165184 A1 7/2006 Purnhagen et al.
2007/0063877 A1 3/2007 Shmunk et al.
2007/0121954 A1 5/2007 Kim et al.
2007/0280485 A1 12/2007 Villemoes
2007/0291951 A1 12/2007 Faller
2008/0234845 A1 9/2008 Malvar et al.
2009/0006103 A1 1/2009 Koishida et al.
2009/0043591 A1 2/2009 Breebaart et al.
2009/0125313 A1 5/2009 Hellmuth et al.
2009/0125314 A1 5/2009 Hellmuth et al.
2009/0210239 A1 8/2009 Yoon et al.
2009/0271015 A1 10/2009 Oh et al.
2009/0278995 A1 11/2009 Oh
2009/0326958 A1 12/2009 Kim et al.
2010/0014680 A1 1/2010 Oh et al.
2010/0017195 A1 1/2010 Villemoes
2010/0083344 A1 4/2010 Schildbach et al.
2010/0094631 A1 4/2010 Engdegard et al.
2010/0121647 A1 5/2010 Beack et al.
2010/0135510 A1 6/2010 Yoo et al.
2010/0153097 A1 6/2010 Hotho et al.
2010/0153118 A1 6/2010 Hotho et al.
2010/0174548 A1 7/2010 Beack et al.
2010/0191354 A1 7/2010 Oh et al.
2010/0202620 A1 8/2010 Oh et al.
2010/0211400 A1 8/2010 Oh et al.
2010/0226500 A1 9/2010 Wang et al.
2010/0262420 A1 10/2010 Herre et al.
2010/0310081 A1 12/2010 Lien et al.
2010/0324915 A1 12/2010 Seo et al.
2011/0022402 A1 1/2011 Engdegard et al.
2011/0029113 A1 2/2011 Ishikawa et al.
2011/0173006 A1 7/2011 Nagel et al.
2011/0182432 A1 7/2011 Ishikawa et al.
2011/0200198 A1 8/2011 Grill et al.
2011/0202355 A1 8/2011 Grill et al.
2011/0238425 A1 9/2011 Neuendorf et al.
2011/0293025 A1 12/2011 Mudulodu et al.
2011/0305344 A1 12/2011 Sole et al.
2012/0002818 A1 1/2012 Heiko et al.
2012/0057715 A1 3/2012 Johnston et al.
2012/0062700 A1 3/2012 Antonellis et al.
2012/0093213 A1 4/2012 Moriya et al.
2012/0143613 A1 6/2012 Herre et al.
2012/0183162 A1 7/2012 Chabanne et al.
2012/0230497 A1 9/2012 Dressler et al.
2012/0243690 A1 9/2012 Engdegard et al.
2012/0269353 A1 10/2012 Herre et al.
2012/0294449 A1 11/2012 Beack et al.
2012/0308049 A1 12/2012 Schreiner et al.
2012/0314875 A1 12/2012 Lee et al.
2012/0323584 A1 12/2012 Koishida et al.
2013/0013321 A1 1/2013 Oh et al.
2013/0110523 A1 5/2013 Beack et al.
2013/0132098 A1 5/2013 Beack et al.
2013/0246077 A1 9/2013 Riedmiller et al.
2014/0133682 A1 * 5/2014 Chabanne ............... H04S 3/002
381/300
2014/0133683 A1 5/2014 Robinson et al.
2014/0257824 A1 9/2014 Taleb et al.
2014/0350944 A1 11/2014 Jot et al.
2016/0111099 A1 4/2016 Hirvonen et al.
2016/0133267 A1 5/2016 Adami et al.

FOREIGN PATENT DOCUMENTS

CN 101151660 A 3/2008
CN 101288115 A 10/2008
CN 101529501 A 9/2009
CN 101542595 A 9/2009
CN 101542596 A 9/2009
CN 101542597 A 9/2009
CN 101553865 A 10/2009
CN 101617360 A 12/2009
CN 101632118 A 1/2010
CN 101689368 A 3/2010
CN 101743586 A 6/2010
CN 101809654 A 8/2010
CN 101821799 A 9/2010
CN 101849257 A 9/2010
CN 101884227 A 11/2010
CN 101926181 A 12/2010
CN 101930741 A 12/2010
CN 102016981 A 4/2011
CN 102016982 A 4/2011
CN 102089816 A 6/2011
CN 102099856 A 6/2011
CN 102123341 A 7/2011
CN 102124517 A 7/2011
CN 102165520 A 8/2011
CN 102171754 A 8/2011
CN 102171755 A 8/2011
CN 102239520 A 11/2011
CN 102387005 A 3/2012
CN 102388417 A 3/2012
CN 102449689 A 5/2012
CN 102576532 A 7/2012

(56) References Cited

FOREIGN PATENT DOCUMENTS

| | | | |
|---|---|---|---|
| CN | 102640213 | A | 8/2012 |
| CN | 102768836 | A | 11/2012 |
| CN | 102883257 | A | 1/2013 |
| CN | 102892070 | A | 1/2013 |
| CN | 102931969 | A | 2/2013 |
| CN | 102100088 | B | 10/2013 |
| CN | 105612577 | B | 10/2019 |
| EP | 2137726 | A1 | 12/2009 |
| EP | 2137824 | A1 | 12/2009 |
| EP | 2146522 | A1 | 1/2010 |
| EP | 2194527 | A2 | 6/2010 |
| EP | 2209328 | A1 | 7/2010 |
| EP | 2479750 | A1 | 7/2012 |
| EP | 2560161 | A1 | 2/2013 |
| GB | 2417866 | A | 3/2006 |
| JP | 2010521013 | A | 6/2010 |
| JP | 2010525403 | A | 7/2010 |
| JP | 2011008258 | A | 1/2011 |
| JP | 2013506164 | A | 2/2013 |
| JP | 2014525048 | A | 9/2014 |
| KR | 20080029940 | A | 4/2008 |
| KR | 20100138716 | A | 12/2010 |
| KR | 20110002489 | A | 1/2011 |
| RU | 2339088 | C1 | 11/2008 |
| RU | 2406166 | C2 | 12/2010 |
| RU | 2411594 | C2 | 2/2011 |
| RU | 2439719 | C2 | 1/2012 |
| RU | 2449387 | C2 | 4/2012 |
| RU | 2483364 | C2 | 5/2013 |
| TW | 200813981 | A | 3/2008 |
| TW | 200828269 | A | 7/2008 |
| TW | 201010450 | A | 3/2010 |
| TW | 201027517 | A | 7/2010 |
| WO | 2006048204 | A1 | 5/2006 |
| WO | 2008039042 | A1 | 4/2008 |
| WO | 2008046531 | A1 | 4/2008 |
| WO | 2008078973 | A1 | 7/2008 |
| WO | 2008111770 | A1 | 9/2008 |
| WO | 2008111773 | A1 | 9/2008 |
| WO | 2008114982 | A1 | 9/2008 |
| WO | 2008131903 | A1 | 11/2008 |
| WO | 2009049895 | A1 | 4/2009 |
| WO | 2009049896 | A1 | 4/2009 |
| WO | 2010076040 | A1 | 7/2010 |
| WO | 2010105695 | A1 | 9/2010 |
| WO | 2010149700 | A1 | 12/2010 |
| WO | 2011020067 | A1 | 2/2011 |
| WO | 2011039195 | A1 | 4/2011 |
| WO | 2011102967 | A1 | 8/2011 |
| WO | 2012072804 | A1 | 6/2012 |
| WO | 2012075246 | A2 | 6/2012 |
| WO | 2012/125855 | A1 | 9/2012 |
| WO | 2012125855 | A1 | 9/2012 |
| WO | 2013/006325 | A1 | 1/2013 |
| WO | 2013006325 | | 1/2013 |
| WO | 2013006325 | A1 | 1/2013 |
| WO | 2013006330 | A2 | 1/2013 |
| WO | 2013006338 | A2 | 1/2013 |
| WO | 2013024085 | A1 | 2/2013 |
| WO | 2013064957 | A1 | 5/2013 |
| WO | 2013075753 | A1 | 5/2013 |
| WO | 2013/006330 | A3 | 7/2013 |

OTHER PUBLICATIONS

"Extensible Markup Language (XML) 1.0 (Fifth Edition)", World Wide Web Consortium [online], http://www.w3.org/TR/2008/REC-xml-20081126/ (printout of internet site on Jun. 23, 2016), Nov. 26, 2008, 35 pp.

"Information technology—Generic Coding of Moving Pictures and Associated Audio Information", ISO/IEC 13818-7, MPEG-2 AAC 3rd edition, ISO/IEC JTC1/SC29/WG11 N6428, Mar. 2004, Mar. 2004, pp. 1-206.

"Information technology—Generic coding of moving pictures and associated audio information—Part 7: Advanced Audio Coding (AAC)", ISO/IEC 13818-7, Part 7 MPEG-2AAC, Aug. 2003, Aug. 2003, 198 pp.

"Information technology—Generic coding of moving pictures and associated audio information—Part 7: Advanced Audio Coding (AAC)", ISO/IEC 13818-7:2004(E), Third edition, Oct. 15, 2004, 206 pp.

"Information technology—MPEG audio technologies—Part 3: Unified speech and audio coding", ISO/IEC FDIS 23003-3:2011(E),, Sep. 20, 2011, 291 pp.

"International Standard ISO/IEC 14772-1:1997—The Virtual Reality Modeling Language (VRML), Part 1: Functional specification and UTF-8 encoding", http://tecfa.unige.ch/guides/vrml/vrml97/spec/, 1997, 2 pp.

"IT—Generic Coding of Moving Pictures and Associated Audio Infomration", ISO/IEC 13818-7. MPEG-2 AAC 3rd edition. ISO/IEC JTC1/SC29/WG11 N6428., Mar. 2004, pp. 1-206.

"Synchronized Multimedia Integration Language (SMIL 3.0)", URL: http://www.w3.org/TR/2008/REC-SMIL3-20081201/, Dec. 2008, 200 pp.

Breebaart, Jeroen, et al., "Spatial Audio Object Coding (SAOC)—The Upcoming MPEG Standard on Parametric Object Based Audio Coding", AES Convention 124; May 2008, AES, 60 East 42nd Street, Room 2520 New York 10165-2520, USA, pp. 1-15.

Chen, Chung Yuan, et al., "Dynamic Light Scattering of poly(vinyl alcohol)—borax aqueous solution near overlap concentration", Polymer Papers, vol. 38, No. 9., Elsevier Science Ltd., XP4058593A, 1997, pp. 2019-2025.

Douglas, David H, et al., "Algorithms for the Reduction of the Number of Points Required to Represent a Digitized Line or its Caricature", Cartographica: The International Journal for Geographic Information and Geovisualization 10.2, 1973, pp. 112-122.

Engdegard, Jonas, et al., "Spatial Audio Object Coding (SAOC)—The Upcoming MPEG Standard on Parametric Object Based Audio Coding", 124th AES Convention, Audio Engineering Society, Paper 7377, pp. 1-15, May 17, 2008.

Geier, Matthias, et al., "Object-based Audio Reproduction and the Audio Scene Description Format", Organised Sound, vol. 15, No. 3, pp. 219-227, Dec. 2010.

Helmrich, Christian R, et al., "Efficient transform coding of two-channel audio signals by means of complex-valued stereo prediction", Acoustics, Speech and Signal Processing (ICASSP), 2011, IEEE International Conference ON, IEEE, XP032000783, DOI: 10.1109/ICASSP.2011.5946449, ISBN: 978-1-4577-0538-0, May 22, 2011, pp. 497-500.

Helmrich, Christian R., et al., "Efficient transform coding of two-channel audio signals by means of complex-valued stereo prediction", Acoustics, Speech and Signal Processing (Icassp), May 22, 2011, IEEE • International Conference, May 22, 2011, pp. 497-500.

Herre, J., et al., "The Reference Model Architecture for MPEG Spatial Audio Coding", AES 118th Convention, Convention paper 6447, Barcelona, Spain, 13 pp., May 28-31, 2005.

Herre, Jurgen, et al., "From SAC to SAOC—Recent Developments in Parametric Coding of Spatial Audio", Fraunhofer Institute for Integrated Circuits, Illusions in Sound, AES 22nd UK Conference 2007,, pp. 12-1-12-8.

Herre, Jurgen, et al., "MPEG Spatial Audio Object Coding—The ISO/MPEG Standard for Efficient Coding of Interactive Audio Scenes", Journal of the Audio Engineering Society. vol. 60. No. 9., pp. 655-673, Sep. 2012.

Herre, Jurgen, et al., "MPEG Surround—the ISO/MPEG Standard for Efficient and Compatible Multi-Channel Audio Coding", AES Convention 122, Convention Paper 7084, XP040508156, New York, May 1, 2007, 24 pp.

Herre, Jurgen, et al., "New Concepts in Parametric Coding of Spatial Audio: From SAC to SAOC", IEEE International Conference on Multimedia and Expo; ISBN 978-1-4244-1016-3, pp. 1894-1897, Jul. 2-5, 2007.

ISO/IEC, "MPEG audio technologies—Part 2: Spatial Audio Object Coding (SAOC)", ISO/IEC JTC1/SC29/WG11 (MPEG) International Standard 23003-2., Oct. 1, 2010, pp. 1-130.

(56) References Cited

OTHER PUBLICATIONS

ISO/IEC 13818, "ISO/IEC 13818, Part 7 MPEG-2AAC", , 198 pp., Aug. 2003.

ISO/IEC 14496-3, "Information technology—Coding of audio-visual objects, Part 3 Audio", Proof Reference No. ISO/IEC 14496-3:2009(E), Fourth Edition, 2009, 1416 pp.

ISO/IEC 14496-3, "Information technology—Coding of audio-visual objects/ Part 3: Audio", ISO/IEC 2009, 2009, 1416 pp.

ISO/IEC 23003-3, "Information Technology—MPEG audio technologies—Part 3: Unified Speech and Audio Coding", International Standard, ISO/IEC FDIS 23003-3, Nov. 23, 2011, 286 pp.

ITU-T, "Information technology—Generic coding of moving pictures and associated audio information: Systems", Series H: Audiovisual and Multimedia Systems; ITU-T Recommendation H.222.0, May 2012, 234 pp.

Neuendorf, Max, et al., "MPEG Unified Speech and Audio Coding—The ISO/MPEG Standard for High-Efficiency Audio Coding of all Content Types", Audio Engineering Society Convention Paper 8654, Presented at the 132nd • Convention, Apr. 26-29, 2012,, pp. 1-22.

Peters, Nils, et al., "SpatDIF: Principles, Specification, and Examples", , Jun. 28, 2013, 6 pp.

Peters, Nils, et al., "SpatDIF: Principles, Specification, and Examples", Peters (SpatDIF:Principles, Specification, and Example), icsi.berkeley.edu, [online], [retrieved on: Aug. 11, 2017], Retrieved from: <http://web.archive.org/web/20130628031935/http://www.icsi.berkeley.edu/pubs/other/ICSI_SpatDif12.pdf>, pp. 1-6.

Peters, Nils, et al., "The Spatial Sound Description Interchange Format: Principles, Specification, and Examples", Computer Music Journal, 37:1, XP055137982, DOI: 10.1162/COMJ_a_00167, Retrieved from the Internet: URL:http://www.mitpressjournals.org/doi/pdfplus/10.1162/COMJ_a_00167 [retrieved on Sep. 3, 2014], pp. 1-22.

Pulkki, Ville, "Virtual Sound Source Positioning Using Vector Base Amplitude Panning", Journal of Audio Eng. Soc. vol. 45, No. 6., pp. 456-466, Jun. 1997.

Ramer, Urs, "An Iterative Procedure", Computer Graphics and Image, vol. 1, pp. 244-256, 1972.

Schmidt, Jurgen, et al., "New and Advanced Features for Audio Presentation in the MPEG-4 Standard", 116th AES Convention, Berlin, Germany, pp. 1-13, May 2004.

Sperschneider, Ralph, "Text of ISO/IEC13818-7:2004 (MPEG-2 AAC 3rd edition)", ISO/IEC JTC1/SC29/WG11 N6428, Munich, Germany,, pp. 1-198.

Sporer, Thomas, "Codierung räumlicher Audiosignale mit leichtgewichtigen Audio-Objekten", Proc. Annual Meeting of the German Audiological Society (DGA), Erlangen, Germany, 22 pp., Mar. 2012.

Valin, JM, et al., "Definition of the Opus Audio Codec", IETF, Sep. 2012, pp. 1-326.

Wright, Matthew, et al., "Open SoundControl: A New Protocol for Communicating with Sound Synthesizers", Proceedings of the 1997 International Computer Music Conference, vol. 2013, No. 8, 5 pp.

* cited by examiner (ENCODER)

(DECODER)

(ENCODER)

(DECODER)

(ENCODER)

(DECODER)

APPARATUS AND METHOD FOR LOW DELAY OBJECT METADATA CODING

CROSS-REFERENCE TO RELATED APPLICATIONS

This application is a continuation of copending U.S. application Ser. No. 16/810,538, filed Mar. 5, 2020, which is a continuation of copending U.S. application Ser. No. 16/360,776, filed Mar. 21, 2019, which is a continuation of copending U.S. application Ser. No. 15/695,791, filed Sep. 5, 2017, which is a continuation of copending U.S. application Ser. No. 15/002,127, filed Jan. 20, 2016, which in turn is a continuation of copending International Application No. PCT/EP2014/065283, filed Jul. 16, 2014, which are all incorporated herein by reference in their entirety, and additionally claims priority from European Applications Nos. EP13177365, filed Jul. 22, 2013, EP13177367, filed Jul. 22, 2013, EP13177378, filed Jul. 22, 2013 and EP13189279, filed Oct. 18, 2013, which are all incorporated herein by reference in their entirety.

BACKGROUND OF THE INVENTION

The present invention is related to audio encoding/decoding, in particular, to spatial audio coding and spatial audio object coding, and, more particularly, to an apparatus and method for efficient object metadata coding.

Spatial audio coding tools are well-known in the art and are, for example, standardized in the MPEG-surround standard. Spatial audio coding starts from original input channels such as five or seven channels which are identified by their placement in a reproduction setup, i.e., a left channel, a center channel, a right channel, a left surround channel, a right surround channel and a low frequency enhancement channel. A spatial audio encoder typically derives one or more downmix channels from the original channels and, additionally, derives parametric data relating to spatial cues such as interchannel level differences in the channel coherence values, interchannel phase differences, interchannel time differences, etc. The one or more downmix channels are transmitted together with the parametric side information indicating the spatial cues to a spatial audio decoder which decodes the downmix channel and the associated parametric data in order to finally obtain output channels which are an approximated version of the original input channels. The placement of the channels in the output setup is typically fixed and is, for example, a 5.1 format, a 7.1 format, etc.

Such channel-based audio formats are widely used for storing or transmitting multi-channel audio content where each channel relates to a specific loudspeaker at a given position. A faithful reproduction of these kind of formats necessitates a loudspeaker setup where the speakers are placed at the same positions as the speakers that were used during the production of the audio signals. While increasing the number of loudspeakers improves the reproduction of truly immersive 3D audio scenes, it becomes more and more difficult to fulfill this requirement—especially in a domestic environment like a living room.

The necessity of having a specific loudspeaker setup can be overcome by an object-based approach where the loudspeaker signals are rendered specifically for the playback setup.

For example, spatial audio object coding tools are well-known in the art and are standardized in the MPEG SAOC standard (SAOC=spatial audio object coding). In contrast to spatial audio coding starting from original channels, spatial audio object coding starts from audio objects which are not automatically dedicated for a certain rendering reproduction setup. Instead, the placement of the audio objects in the reproduction scene is flexible and can be determined by the user by inputting certain rendering information into a spatial audio object coding decoder. Alternatively or additionally, rendering information, i.e., information at which position in the reproduction setup a certain audio object is to be placed typically over time can be transmitted as additional side information or metadata. In order to obtain a certain data compression, a number of audio objects are encoded by an SAOC encoder which calculates, from the input objects, one or more transport channels by downmixing the objects in accordance with certain downmixing information. Furthermore, the SAOC encoder calculates parametric side information representing inter-object cues such as object level differences (OLD), object coherence values, etc. As in SAC (SAC=Spatial Audio Coding), the inter object parametric data is calculated for individual time/frequency tiles, i.e., for a certain frame of the audio signal comprising, for example, 1024 or 2048 samples, 24, 32, or 64, etc., frequency bands are considered so that, in the end, parametric data exists for each frame and each frequency band. As an example, when an audio piece has 20 frames and when each frame is subdivided into 32 frequency bands, then the number of time/frequency tiles is 640.

In an object-based approach, the sound field is described by discrete audio objects. This necessitates object metadata that describes among others the time-variant position of each sound source in 3D space.

A first metadata coding concept in conventional technology is the spatial sound description interchange format (SpatDIF), an audio scene description format which is still under development [1]. It is designed as an interchange format for object-based sound scenes and does not provide any compression method for object trajectories. SpatDIF uses the text-based Open Sound Control (OSC) format to structure the object metadata [2]. A simple text-based representation, however, is not an option for the compressed transmission of object trajectories.

Another metadata concept in conventional technology is the Audio Scene Description Format (ASDF) [3], a text-based solution that has the same disadvantage. The data is structured by an extension of the Synchronized Multimedia Integration Language (SMIL) which is a sub set of the Extensible Markup Language (XML) [4,5].

A further metadata concept in conventional technology is the audio binary format for scenes (AudioBlFS), a binary format that is part of the MPEG-4 specification [6,7]. It is closely related to the XML-based Virtual Reality Modeling Language (VRML) which was developed for the description of audio-visual 3D scenes and interactive virtual reality applications [8]. The complex AudioBIFS specification uses scene graphs to specify routes of object movements. A major disadvantage of AudioBIFS is that is not designed for real-time operation where a limited system delay and random access to the data stream are a requirement. Furthermore, the encoding of the object positions does not exploit the limited localization performance of human listeners. For a fixed listener position within the audio-visual scene, the object data can be quantized with a much lower number of bits [9]. Hence, the encoding of the object metadata that is applied in AudioBlFS is not efficient with regard to data compression.

It would therefore be highly appreciated, if improved, efficient object metadata coding concepts would be provided.

SUMMARY

According to an embodiment, an apparatus for generating one or more audio channels has: a metadata decoder for generating one or more reconstructed metadata signals from one or more processed metadata signals depending on a control signal, wherein each of the one or more reconstructed metadata signals indicates information associated with an audio signal of one or more audio signals, wherein the metadata decoder is configured to generate the one or more reconstructed metadata signals by determining a plurality of reconstructed metadata samples for each of the one or more reconstructed metadata signals, and an audio channel generator for generating the one or more audio channels depending on the one or more audio signals and depending on the one or more reconstructed metadata signals, wherein the metadata decoder is configured to receive a plurality of processed metadata samples of each of the one or more processed metadata signals, wherein the metadata decoder is configured to receive the control signal, wherein the metadata decoder is configured to determine each reconstructed metadata sample of the plurality of reconstructed metadata samples of each reconstructed metadata signal of the one or more reconstructed metadata signals, so that, when the control signal indicates a first state, said reconstructed metadata sample is a sum of one of the processed metadata samples of one of the one or more processed metadata signals and of another already generated reconstructed metadata sample of said reconstructed metadata signal, and so that, when the control signal indicates a second state being different from the first state, said reconstructed metadata sample is said one of the processed metadata samples of said one of the one or more processed metadata signals.

According to another embodiment, an apparatus for generating encoded audio information comprising one or more encoded audio signals and one or more processed metadata signals has: a metadata encoder for receiving one or more original metadata signals and for determining the one or more processed metadata signals, wherein each of the one or more original metadata signals comprises a plurality of original metadata samples, wherein the original metadata samples of each of the one or more original metadata signals indicate information associated with an audio signal of one or more audio signals, and an audio encoder for encoding the one or more audio signals to acquire the one or more encoded audio signals, wherein the metadata encoder is configured to determine each processed metadata sample of a plurality of processed metadata samples of each processed metadata signal of the one or more processed metadata signals, so that, when a control signal indicates a first state, said processed metadata sample indicates a difference or a quantized difference between one of the plurality of original metadata samples of one of the one or more original metadata signals and of another already generated processed metadata sample of said processed metadata signal, and so that, when the control signal indicates a second state being different from the first state, said processed metadata sample is said one of the original metadata samples of said one of the one or more original metadata signals, or is a quantized representation said one of the original metadata samples.

According to another embodiment, a system has: an inventive apparatus for generating encoded audio information comprising one or more encoded audio signals and one or more processed metadata signals, and an inventive apparatus for receiving the one or more encoded audio signals and the one or more processed metadata signals, and for generating one or more audio channels depending on the one or more encoded audio signals and depending on the one or more processed metadata signals.

According to another embodiment, a method for generating one or more audio channels has the steps of: generating one or more reconstructed metadata signals from one or more processed metadata signals depending on a control signal, wherein each of the one or more reconstructed metadata signals indicates information associated with an audio signal of one or more audio signals, wherein generating the one or more reconstructed metadata signals is conducted by determining a plurality of reconstructed metadata samples for each of the one or more reconstructed metadata signals, and generating the one or more audio channels depending on the one or more audio signals and depending on the one or more reconstructed metadata signals, wherein generating the one or more reconstructed metadata signals is conducted by receiving a plurality of processed metadata samples of each of the one or more processed metadata signals, by receiving the control signal, and by determining each reconstructed metadata sample of the plurality of reconstructed metadata samples of each reconstructed metadata signal of the one or more reconstructed metadata signals, so that, when the control signal indicates a first state, said reconstructed metadata sample is a sum of one of the processed metadata samples of one of the one or more processed metadata signals and of another already generated reconstructed metadata sample of said reconstructed metadata signal, and so that, when the control signal indicates a second state being different from the first state, said reconstructed metadata sample is said one of the processed metadata samples of said one of the one or more processed metadata signals.

According to another embodiment, a method for generating encoded audio information comprising one or more encoded audio signals and one or more processed metadata signals has the steps of: receiving one or more original metadata signals, determining the one or more processed metadata signals, and encoding one or more audio signals to acquire the one or more encoded audio signals, wherein each of the one or more original metadata signals comprises a plurality of original metadata samples, wherein the original metadata samples of each of the one or more original metadata signals indicate information associated with an audio signal of the one or more audio signals, and wherein determining the one or more processed metadata signals comprises determining each processed metadata sample of a plurality of processed metadata samples of each processed metadata signal of the one or more processed metadata signals, so that, when the control signal indicates a first state, said processed metadata sample indicates a difference or a quantized difference between one of the plurality of original metadata samples of one of the one or more original metadata signals and of another already generated processed metadata sample of said processed metadata signal, and so that, when the control signal indicates a second state being different from the first state, said processed metadata sample is said one of the original metadata samples of said one of the one or more original metadata signals, or is a quantized representation said one of the original metadata samples.

Another embodiment may have a non-transitory digital storage medium having a computer program stored thereon to perform the method for generating one or more audio channels, wherein the method has the steps of: generating one or more reconstructed metadata signals from one or more processed metadata signals depending on a control signal, wherein each of the one or more reconstructed metadata signals indicates information associated with an audio signal of one or more audio signals, wherein generating the one or more reconstructed metadata signals is conducted by determining a plurality of reconstructed metadata samples for each of the one or more reconstructed metadata signals, and generating the one or more audio channels depending on the one or more audio signals and depending on the one or more reconstructed metadata signals, wherein generating the one or more reconstructed metadata signals is conducted by receiving a plurality of processed metadata samples of each of the one or more processed metadata signals, by receiving the control signal, and by determining each reconstructed metadata sample of the plurality of reconstructed metadata samples of each reconstructed metadata signal of the one or more reconstructed metadata signals, so that, when the control signal indicates a first state, said reconstructed metadata sample is a sum of one of the processed metadata samples of one of the one or more processed metadata signals and of another already generated reconstructed metadata sample of said reconstructed metadata signal, and so that, when the control signal indicates a second state being different from the first state, said reconstructed metadata sample is said one of the processed metadata samples of said one of the one or more processed metadata signals, when said computer program is run by a computer.

Another embodiment may have a non-transitory digital storage medium having a computer program stored thereon to perform the method for generating encoded audio information comprising one or more encoded audio signals and one or more processed metadata signals, wherein the method has the steps of: receiving one or more original metadata signals, determining the one or more processed metadata signals, and encoding one or more audio signals to acquire the one or more encoded audio signals, wherein each of the one or more original metadata signals comprises a plurality of original metadata samples, wherein the original metadata samples of each of the one or more original metadata signals indicate information associated with an audio signal of the one or more audio signals, and wherein determining the one or more processed metadata signals comprises determining each processed metadata sample of a plurality of processed metadata samples of each processed metadata signal of the one or more processed metadata signals, so that, when the control signal indicates a first state, said processed metadata sample indicates a difference or a quantized difference between one of the plurality of original metadata samples of one of the one or more original metadata signals and of another already generated processed metadata sample of said processed metadata signal, and so that, when the control signal indicates a second state being different from the first state, said processed metadata sample is said one of the original metadata samples of said one of the one or more original metadata signals, or is a quantized representation said one of the original metadata samples, when said computer program is run by a computer.

An apparatus for generating one or more audio channels is provided. The apparatus comprises a metadata decoder for generating one or more reconstructed metadata signals ($x_1', \ldots, x_N'$) from one or more processed metadata signals ($z_1, \ldots, z_N$) depending on a control signal (b), wherein each of the one or more reconstructed metadata signals ($x_1', \ldots, x_N'$) indicates information associated with an audio object signal of one or more audio object signals, wherein the metadata decoder is configured to generate the one or more reconstructed metadata signals ($x_1', \ldots, x_N'$) by determining a plurality of reconstructed metadata samples ($x_1'(n), \ldots, x_N'(n)$) for each of the one or more reconstructed metadata signals ($x_1', \ldots, x_N'$). Moreover, the apparatus comprises an audio channel generator for generating the one or more audio channels depending on the one or more audio object signals and depending on the one or more reconstructed metadata signals ($x_1', \ldots, x_N'$). The metadata decoder is configured to receive a plurality of processed metadata samples ($z_1(n), \ldots, z_N(n)$) of each of the one or more processed metadata signals ($z_1, \ldots, z_N$). Moreover, the metadata decoder is configured to receive the control signal (b). Furthermore, the metadata decoder is configured to determine each reconstructed metadata sample ($x_i'(n)$) of the plurality of reconstructed metadata samples ($x_i'(1), \ldots x_i'(n-1), x_i'(n)$) of each reconstructed metadata signal ($x_i'$) of the one or more reconstructed metadata signals ($x_1', \ldots, x_N'$), so that, when the control signal (b) indicates a first state ($b(n)=0$), said reconstructed metadata sample ($x_i'(n)$) is a sum of one of the processed metadata samples ($z_i(n)$) of one of the one or more processed metadata signals ($z_i$) and of another already generated reconstructed metadata sample ($x_i'(n-1)$) of said reconstructed metadata signal ($x_i'$), and so that, when the control signal indicates a second state ($b(n)=1$) being different from the first state, said reconstructed metadata sample ($x_i'(n)$) is said one ($z_i(n)$) of the processed metadata samples ($z_i(1), \ldots, z_i(n)$) of said one ($z_i$) of the one or more processed metadata signals ($z_1, \ldots, z_N$).

Moreover, an apparatus for generating encoded audio information comprising one or more encoded audio signals and one or more processed metadata signals is provided. The apparatus comprises a metadata encoder for receiving one or more original metadata signals and for determining the one or more processed metadata signals, wherein each of the one or more original metadata signals comprises a plurality of original metadata samples, wherein the original metadata samples of each of the one or more original metadata signals indicate information associated with an audio object signal of one or more audio object signals.

Moreover, the apparatus comprises an audio encoder for encoding the one or more audio object signals to obtain the one or more encoded audio signals.

The metadata encoder is configured to determine each processed metadata sample ($z_i(n)$) of a plurality of processed metadata samples ($z_i(1), \ldots z_i(n-1), z_i(n)$) of each processed metadata signal ($z_i$) of the one or more processed metadata signals ($z_1, \ldots, z_N$), so that, when the control signal (b) indicates a first state ($b(n)=0$), said reconstructed metadata sample ($z_i(n)$) indicates a difference or a quantized difference between one of a plurality of original metadata samples ($x_i(n)$) of one of the one or more original metadata signals ($x_i$) and of another already generated processed metadata sample of said processed metadata signal ($z_i$), and so that, when the control signal indicates a second state ($b(n)=1$) being different from the first state, said processed metadata sample ($z_i(n)$) is said one ($x_i(n)$) of the original metadata samples ($x_i(1), \ldots, x_i(n)$) of said one of the one or more processed metadata signals ($x_i$), or is a quantized representation ($q_i(n)$) said one ($x_i(n)$) of the original metadata samples ($x_i(1), \ldots, x_i(n)$).

According to embodiments, data compression concepts for object metadata are provided, which achieve efficient compression mechanism for transmission channels with limited data rate. No additional delay is introduced by the encoder and decoder, respectively. Moreover, a good compression rate for pure azimuth changes, for example, camera rotations, is achieved. Furthermore, the provided concepts support discontinuous trajectories, e.g., positional jumps.

Moreover, low decoding complexity is realized. Furthermore, random access with limited reinitialization time is achieved.

Moreover, a method for generating one or more audio channels is provided. The method comprises:

Generating one or more reconstructed metadata signals ($x_1'$, . . . , $x_N'$) from one or more processed metadata signals ($z_1$, . . . , $z_N$) depending on a control signal (b), wherein each of the one or more reconstructed metadata signals indicates information associated with an audio object signal of one or more audio object signals, wherein generating the one or more reconstructed metadata signals ($x_1'$, . . . , $x_N'$) is conducted by determining a plurality of reconstructed metadata samples ($x_1'(n)$, . . . , $x_N'(n)$) for each of the one or more reconstructed metadata signals ($x_1'$, . . . , $x_N'$). And:

Generating the one or more audio channels depending on the one or more audio object signals and depending on the one or more reconstructed metadata signals ($x_1'$, . . . , $x_N'$).

Generating the one or more reconstructed metadata signals ($x_1'$, . . . , $x_N'$) is conducted by receiving a plurality of processed metadata samples ($z_i(n)$, . . . , $z_N(n)$) of each of the one or more processed metadata signals ($z_1$, . . . , $z_N$), by receiving the control signal (b), and by determining each reconstructed metadata sample ($x_1'(n)$) of the plurality of reconstructed metadata samples ($x_1'(1)$, . . . $x_i'(n-1)$, $x_i'(n)$) of each reconstructed metadata signal ($x_i'$) of the one or more reconstructed metadata signals ($x_1'$, . . . , $x_N'$), so that, when the control signal (b) indicates a first state (b(n)=0), said reconstructed metadata sample ($x_i'(n)$) is a sum of one of the processed metadata samples ($z_i(n)$) of one of the one or more processed metadata signals ($z_i$) and of another already generated reconstructed metadata sample ($x_i'(n-1)$) of said reconstructed metadata signal ($x_i'$), and so that, when the control signal indicates a second state (b(n)=1) being different from the first state, said reconstructed metadata sample ($x_i'(n)$) is said one ($z_i(n)$) of the processed metadata samples ($z_i(1)$, . . . , $z_i(n)$) of said one ($z_i$) of the one or more processed metadata signals ($z_1$, . . . , $z_N$).

Furthermore, a method for generating encoded audio information comprising one or more encoded audio signals and one or more processed metadata signals is provided. The method comprises:

Receiving one or more original metadata signals.

Determining the one or more processed metadata signals. And:

Encoding the one or more audio object signals to obtain the one or more encoded audio signals.

Each of the one or more original metadata signals comprises a plurality of original metadata samples, wherein the original metadata samples of each of the one or more original metadata signals indicate information associated with an audio object signal of one or more audio object signals. Determining the one or more processed metadata signals comprises determining each processed metadata sample ($z_i(n)$) of a plurality of processed metadata samples ($z_i(1)$, . . . $z_i(n-1)$, $z_i(n)$) of each processed metadata signal ($z_i$) of the one or more processed metadata signals ($z_1$, . . . , $z_N$), so that, when the control signal (b) indicates a first state (b(n)=0), said reconstructed metadata sample ($z_i(n)$) indicates a difference or a quantized difference between one of a plurality of original metadata samples ($x_i(n)$) of one of the one or more original metadata signals ($x_i$) and of another already generated processed metadata sample of said processed metadata signal ($z_i$), and so that, when the control signal indicates a second state (b(n)=1) being different from the first state, said processed metadata sample ($z_i(n)$) is said one ($x_i(n)$) of the original metadata samples ($x_i(1)$, . . . , $x_i(n)$) of said one of the one or more processed metadata signals ($x_i$), or is a quantized representation ($q_i(n)$) said one ($x_i(n)$) of the original metadata samples ($x_i(1)$, . . . , $x_i(n)$).

Moreover, a computer program for implementing the above-described method when being executed on a computer or signal processor is provided.

BRIEF DESCRIPTION OF THE DRAWINGS

Embodiments of the present invention will be detailed subsequently referring to the appended drawings, in which.

DETAILED DESCRIPTION OF THE INVENTION

Figure 2:
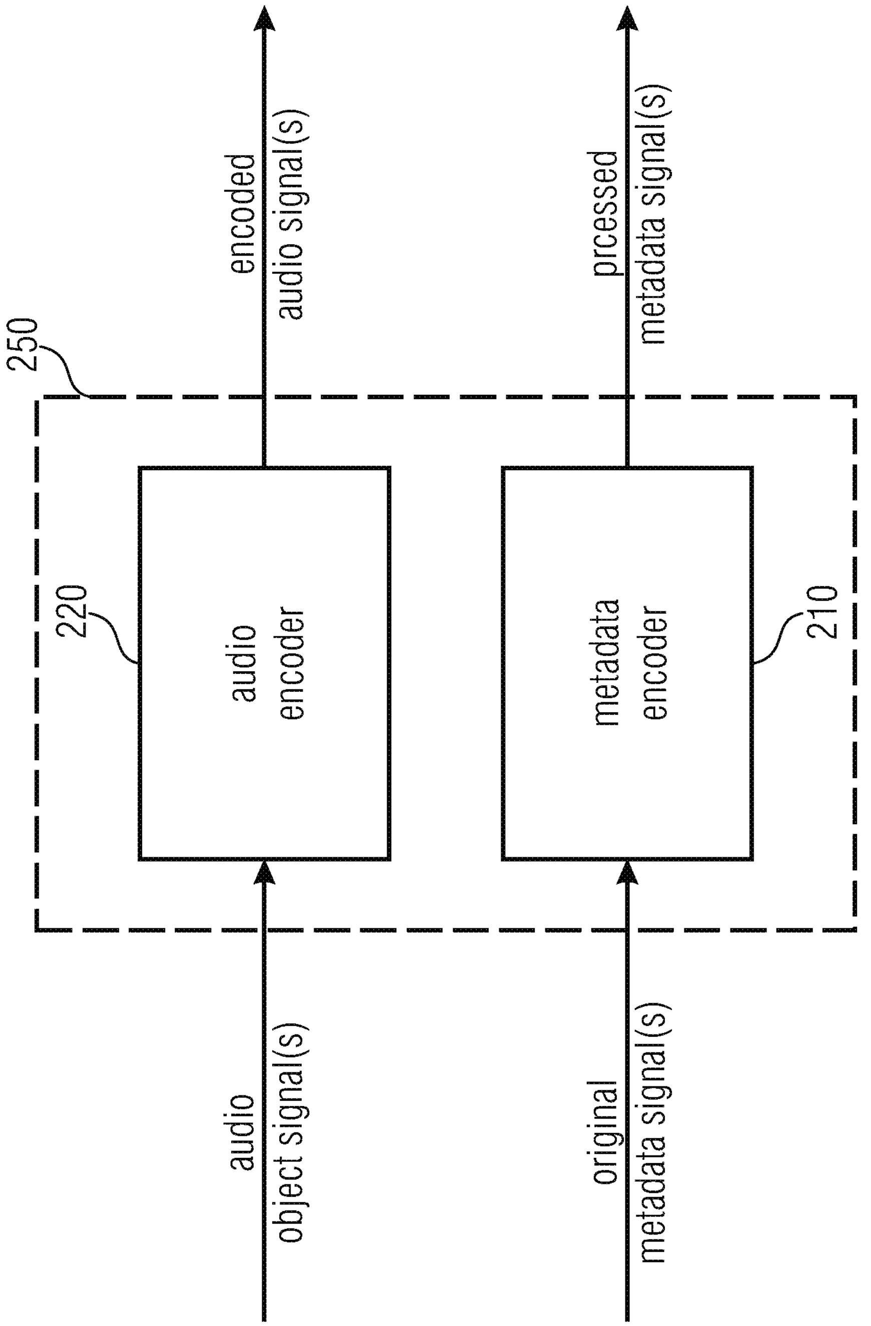
FIG. 2 illustrates an apparatus for generating encoded audio information according to an embodiment.

FIG. 2 illustrates an apparatus 250 for generating encoded audio information comprising one or more encoded audio signals and one or more processed metadata signals according to an embodiment.

The apparatus 250 comprises a metadata encoder 210 for receiving one or more original metadata signals and for determining the one or more processed metadata signals, wherein each of the one or more original metadata signals comprises a plurality of original metadata samples, wherein the original metadata samples of each of the one or more original metadata signals indicate information associated with an audio object signal of one or more audio object signals.

Moreover, the apparatus 250 comprises an audio encoder 220 for encoding the one or more audio object signals to obtain the one or more encoded audio signals.

The metadata encoder 210 is configured to determine each processed metadata sample ($z_i(n)$) of a plurality of processed metadata samples ($z_i(1), \ldots z_i(n-1), z_i(n)$) of each processed metadata signal ($z_i$) of the one or more processed metadata signals ($z_1, \ldots, z_N$), so that, when the control signal (b) indicates a first state (b(n)=0), said reconstructed metadata sample ($z_i(n)$) indicates a difference or a quantized difference between one of a plurality of original metadata samples ($x_i(n)$) of one of the one or more original metadata signals ($x_i$) and of another already generated processed metadata sample of said processed metadata signal ($z_i$), and so that, when the control signal indicates a second state (b(n)=1) being different from the first state, said processed metadata sample ($z_i(n)$) is said one ($x_i(n)$) of the original metadata samples ($x_i(1), \ldots, x_i(n)$) of said one of the one or more processed metadata signals ($x_i$), or is a quantized representation ($q_i(n)$) said one ($x_i(n)$) of the original metadata samples ($x_i(1), \ldots, x_i(n)$).

Figure 1:
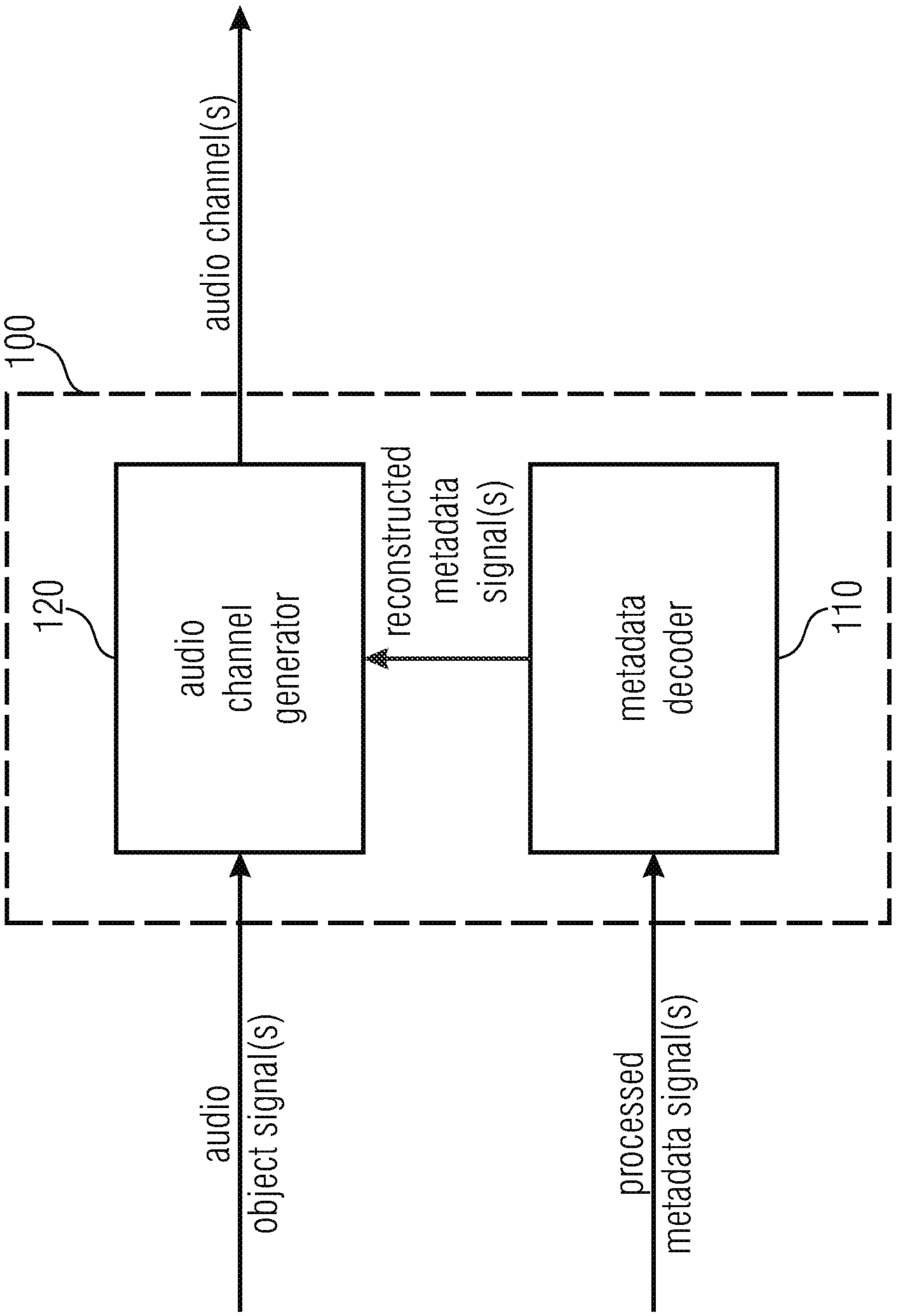
FIG. 1 illustrates an apparatus for generating one or more audio channels according to an embodiment.

FIG. 1 illustrates an apparatus 100 for generating one or more audio channels according to an embodiment.

The apparatus 100 comprises a metadata decoder 110 for generating one or more reconstructed metadata signals ($x_1', \ldots, x_N'$) from one or more processed metadata signals ($z_1, \ldots, z_N$) depending on a control signal (b), wherein each of the one or more reconstructed metadata signals ($x_1', \ldots, x_N'$) indicates information associated with an audio object signal of one or more audio object signals, wherein the metadata decoder 110 is configured to generate the one or more reconstructed metadata signals ($x_1', \ldots, x_N'$) by determining a plurality of reconstructed metadata samples ($x_1'(n), \ldots, x_N'(n)$) for each of the one or more reconstructed metadata signals ($x_1', \ldots, x_N'$).

Moreover, the apparatus 100 comprises an audio channel generator 120 for generating the one or more audio channels depending on the one or more audio object signals and depending on the one or more reconstructed metadata signals ($x_1', \ldots, x_N'$).

The metadata decoder 110 is configured to receive a plurality of processed metadata samples ($z_1(n), \ldots, z_N(n)$) of each of the one or more processed metadata signals ($z_1, \ldots, z_N$). Moreover, the metadata decoder 110 is configured to receive the control signal (b).

Furthermore, the metadata decoder 110 is configured to determine each reconstructed metadata sample ($x_i'(n)$) of the plurality of reconstructed metadata samples ($x_i'(1), \ldots x_i'(n-1), x_i'(n)$) of each reconstructed metadata signal ($x_i'$) of the one or more reconstructed metadata signals ($x_1', \ldots, x_N'$), so that, when the control signal (b) indicates a first state (b(n)=0), said reconstructed metadata sample ($x_i'(n)$) is a sum of one of the processed metadata samples ($z_i(n)$) of one of the one or more processed metadata signals ($z_i$) and of another already generated reconstructed metadata sample ($x_i'(n-1)$) of said reconstructed metadata signal ($x_i'$), and so that, when the control signal indicates a second state (b(n)=1) being different from the first state, said reconstructed metadata sample ($x_i'(n)$) is said one ($z_i(n)$) of the processed metadata samples ($z_i(1), \ldots, z_i(n)$) of said one ($z_i$) of the one or more processed metadata signals ($z_1, \ldots, z_N$).

When referring to metadata samples, it should be noted, that a metadata sample is characterised by its metadata sample value, but also by the instant of time, to which it relates. For example, such an instant of time may be relative to the start of an audio sequence or similar. For example, an index n or k might identify a position of the metadata sample in a metadata signal and by this, a (relative) instant of time (being relative to a start time) is indicated. It should be noted that when two metadata samples relate to different instants of time, these two metadata samples are different metadata samples, even when their metadata sample values are equal, what sometimes may be the case.

The above embodiments are based on the finding that metadata information (comprised by a metadata signal) that is associated with an audio object signal often changes slowly.

For example, a metadata signal may indicate position information on an audio object (e.g., an azimuth angle, an elevation angle or a radius defining the position of an audio object). It may be assumed that, at most times, the position of the audio object either does not change or only changes slowly.

Or, a metadata signal may, for example, indicate a volume (e.g., a gain) of an audio object, and it may also be assumed, that at most times, the volume of an audio object changes slowly.

For this reason, it is not necessitated to transmit the (complete) metadata information at every instant of time.

Instead, the (complete) metadata information, may, for example, according to some embodiments, only be transmitted at certain instants of time, for example, periodically, e.g., at every N-th instant of time, e.g., at point in time 0, N, 2N, 3N, etc.

For example, in embodiments, three metadata signals specify the position of an audio object in a 3D space. A first one of the metadata signals may, e.g., specify the azimuth angle of the position of the audio object. A second one of the metadata signals may, e.g., specify the elevation angle of the position of the audio object. A third one of the metadata signals may, e.g., specify the radius relating to the distance of the audio object.

Azimuth angle, elevation angle and radius unambiguously define the position of an audio object in a 3D space from an origin. This is illustrated with reference to FIG. 4.

Figure 4:
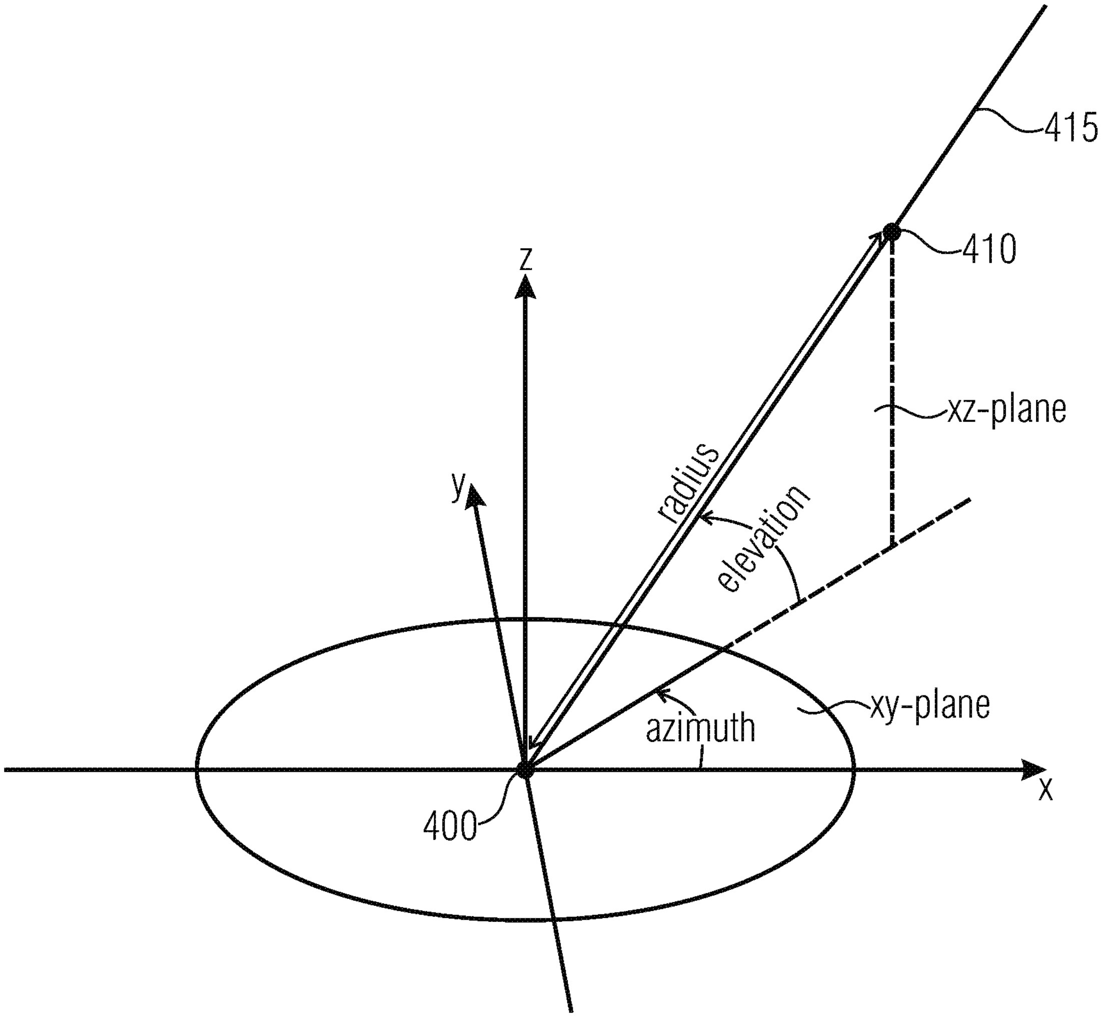
FIG. 4 illustrates the position of an audio object in a three-dimensional space from an origin expressed by azimuth, elevation and radius.

FIG. 4 illustrates the position 410 of an audio object in a three-dimensional (3D) space from an origin 400 expressed by azimuth, elevation and radius.

The elevation angle specifies, for example, the angle between the straight line from the origin to the object position and the normal projection of this straight line onto the xy-plane (the plane defined by the x-axis and the y-axis). The azimuth angle defines, for example, the angle between the x-axis and the said normal projection. By specifying the azimuth angle and the elevation angle, the straight line 415 through the origin 400 and the position 410 of the audio object can be defined. By furthermore specifying the radius, the exact position 410 of the audio object can be defined.

In an embodiment, the azimuth angle is defined for the range: $-180° < \text{azimuth} \leq 180°$, the elevation angle is defined for the range: $-90° \leq \text{elevation} \leq 90°$ and the radius may, for example, be defined in meters [m] (greater than or equal to 0 m).

In another embodiment, where it, may, for example, be assumed that all x-values of the audio object positions in an xyz-coordinate system are greater than or equal to zero, the azimuth angle may be defined for the range: −90° azimuth 90°, the elevation angle may be defined for the range: $-90° \leq \text{elevation} \leq 90°$, and the radius may, for example, be defined in meters [m].

In a further embodiment, the metadata signals may be scaled such that the azimuth angle is defined for the range: $-128° < \text{azimuth} \leq 128°$, the elevation angle is defined for the range: $-32° \leq \text{elevation} \leq 32°$ and the radius may, for example, be defined on a logarithmic scale. In some embodiments, the original metadata signals, the processed metadata signals and the reconstructed metadata signals, respectively, may comprise a scaled representation of a position information and/or a scaled representation of a volume of one of the one or more audio object signals.

The audio channel generator 120 may, for example, be configured to generate the one or more audio channels depending on the one or more audio object signals and depending on the reconstructed metadata signals, wherein the reconstructed metadata signals may, for example, indicate the position of the audio objects.

Figure 5:
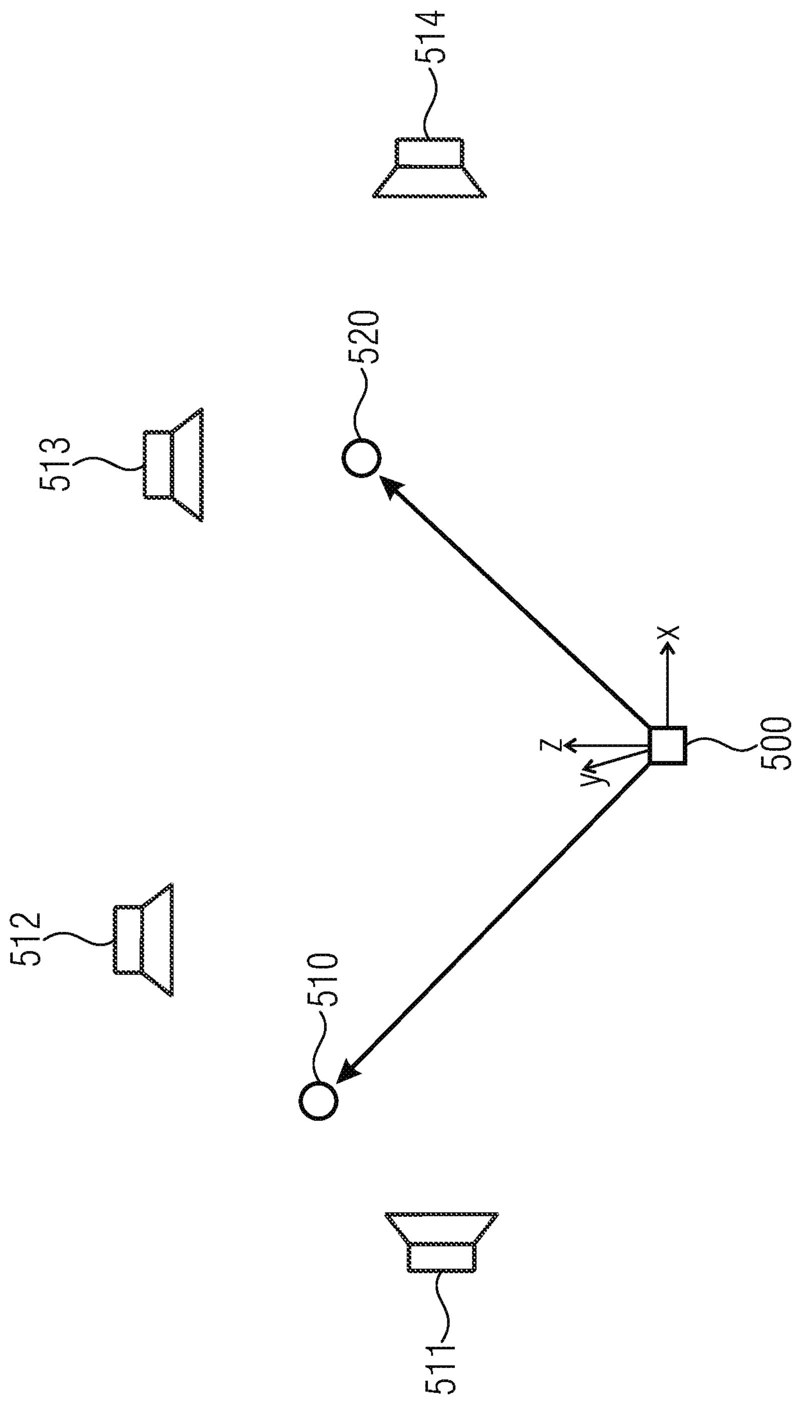
FIG. 5 illustrates positions of audio objects and a loudspeaker setup assumed by the audio channel generator.

FIG. 5 illustrates positions of audio objects and a loudspeaker setup assumed by the audio channel generator. The origin 500 of the xyz-coordinate system is illustrated. Moreover, the position 510 of a first audio object and the position 520 of a second audio object is illustrated. Furthermore, FIG. 5 illustrates a scenario, where the audio channel generator 120 generates four audio channels for four loudspeakers. The audio channel generator 120 assumes that the four loudspeakers 511, 512, 513 and 514 are located at the positions shown in FIG. 5.

In FIG. 5, the first audio object is located at a position 510 close to the assumed positions of loudspeakers 511 and 512, and is located far away from loudspeakers 513 and 514. Therefore, the audio channel generator 120 may generate the four audio channels such that the first audio object 510 is reproduced by loudspeakers 511 and 512 but not by loudspeakers 513 and 514.

In other embodiments, audio channel generator 120 may generate the four audio channels such that the first audio object 510 is reproduced with a high volume by loudspeakers 511 and 512 and with a low volume by loudspeakers 513 and 514.

Moreover, the second audio object is located at a position 520 close to the assumed positions of loudspeakers 513 and 514, and is located far away from loudspeakers 511 and 512. Therefore, the audio channel generator 120 may generate the four audio channels such that the second audio object 520 is reproduced by loudspeakers 513 and 514 but not by loudspeakers 511 and 512.

In other embodiments, audio channel generator 120 may generate the four audio channels such that the second audio object 520 is reproduced with a high volume by loudspeakers 513 and 514 and with a low volume by loudspeakers 511 and 512.

In alternative embodiments, only two metadata signals are used to specify the position of an audio object. For example, only the azimuth and the radius may be specified, for example, when it is assumed that all audio objects are located within a single plane.

In further other embodiments, for each audio object, only a single metadata signal is encoded and transmitted as position information. For example, only an azimuth angle may be specified as position information for an audio object (e.g., it may be assumed that all audio objects are located in the same plane having the same distance from a center point, and are thus assumed to have the same radius). The azimuth information may, for example, be sufficient to determine that an audio object is located close to a left loudspeaker and far away from a right loudspeaker. In such a situation, the audio channel generator 120 may, for example, generate the one or more audio channels such that the audio object is reproduced by the left loudspeaker, but not by the right loudspeaker.

For example, Vector Base Amplitude Panning (VBAP) may be employed (see, e.g., [11]) to determine the weight of an audio object signal within each of the audio channels of the loudspeakers. E.g., with respect to VBAP, it is assumed that an audio object relates to a virtual source.

In embodiments, a further metadata signal may specify a volume, e.g., a gain (for example, expressed in decibel [dB]) for each audio object.

For example, in FIG. 5, a first gain value may be specified by a further metadata signal for the first audio object located at position 510 which is higher than a second gain value being specified by another further metadata signal for the second audio object located at position 520. In such a situation, the loudspeakers 511 and 512 may reproduce the first audio object with a volume being higher than the volume with which loudspeakers 513 and 514 reproduce the second audio object.

Embodiments also assume that such gain values of audio objects often change slowly. Therefore, it is not necessitated to transmit such metadata information at every point in time. Instead, metadata information is only transmitted at certain points in time. At intermediate points in time, the metadata information may, e.g., be approximated using the preceding metadata sample and the succeeding metadata sample, that were transmitted. For example, linear interpolation may be employed for approximation of intermediate values. E.g., the gain, the azimuth, the elevation and/or the radius of each of the audio objects may be approximated for points in time, where such metadata was not transmitted.

By such an approach, considerable savings in the transmission rate of metadata can be achieved.

Figure 3:
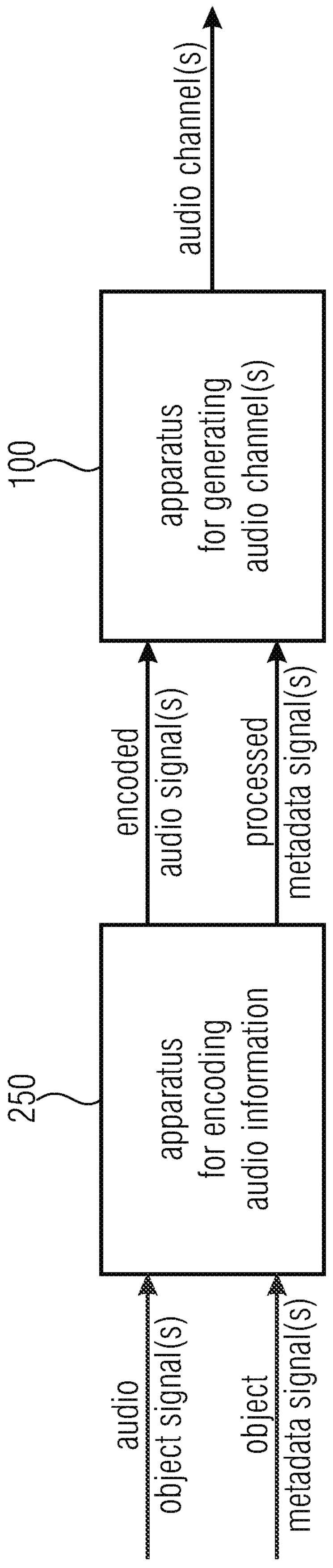
FIG. 3 illustrates a system according to an embodiment.

FIG. 3 illustrates a system according to an embodiment.

The system comprises an apparatus 250 for generating encoded audio information comprising one or more encoded audio signals and one or more processed metadata signals as described above.

Moreover, the system comprises an apparatus 100 for receiving the one or more encoded audio signals and the one or more processed metadata signals, and for generating one or more audio channels depending on the one or more encoded audio signals and depending on the one or more processed metadata signals as described above.

For example, the one or more encoded audio signals may be decoded by the apparatus 100 for generating one or more audio channels by employing a SAOC decoder according to the state of the art to obtain one or more audio object signals, when the apparatus 250 for encoding did use a SAOC encoder for encoding the one or more audio objects.

Embodiments are based on the finding, that concepts of the Differential Pulse Code Modulation may be extended, and, such extended concepts are then suitable to encode metadata signals for audio objects.

The Differential Pulse Code Modulation (DPCM) method is an established method for slowly varying time signals that reduces irrelevance via quantization and redundancy via a differential transmission [10]. A DPCM encoder is shown in FIG. 6.

Figure 6:
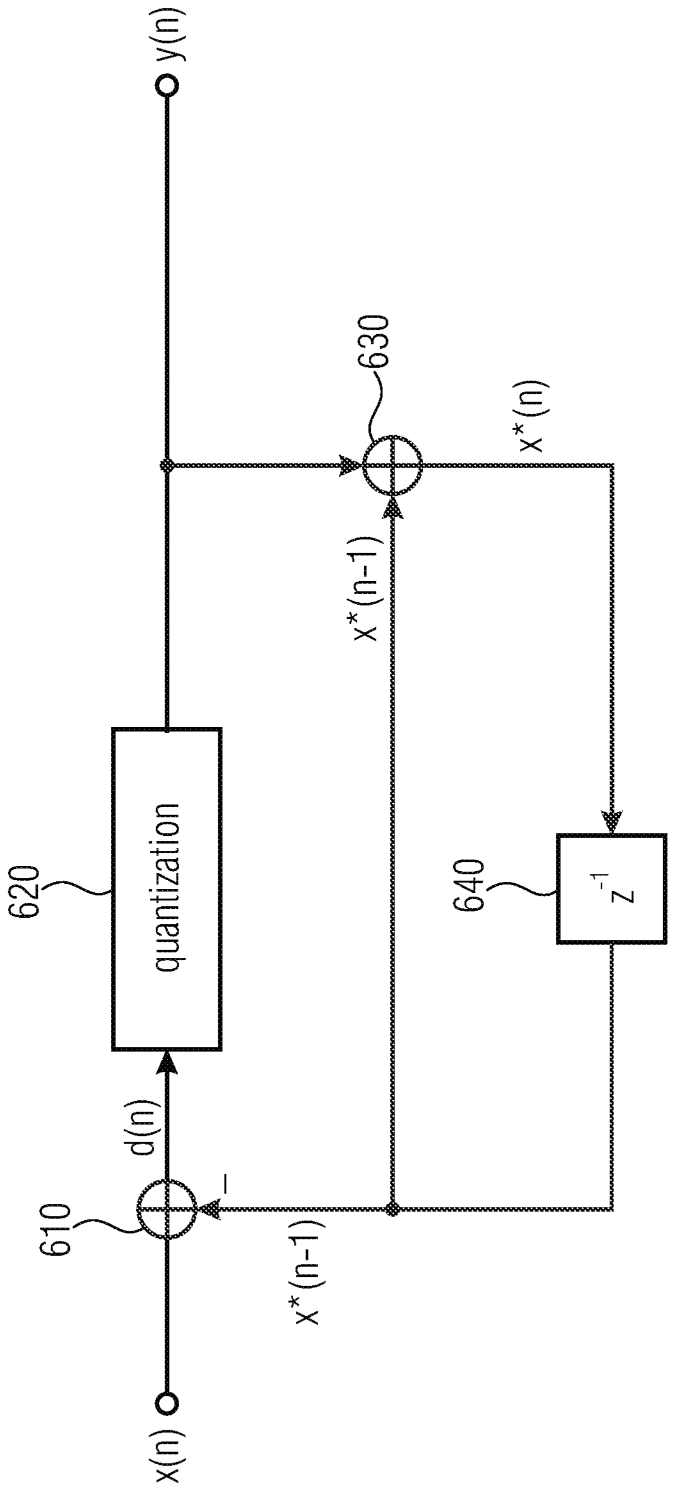
FIG. 6 illustrates a Differential Pulse Code Modulation encoder.

In the DPCM encoder of FIG. 6, an actual input sample $x(n)$ of an input signal x is fed into a subtraction unit 610. At the other input of the subtraction unit, another value is fed into the subtraction unit. It may be assumed that this other value is the previously received sample $x(n-1)$, although quantization errors or other errors may have the result that the value at other input is not exactly identical to the previous sample $x(n-1)$. Because of such possible deviations from $x(n-1)$, the other input of the subtractor may be referred to as $x^*(n-1)$ The subtraction unit subtracts $x^*(n-1)$ from $x(n)$ to obtain the difference value $d(n)$.

$d(n)$ is then quantized in quantizer 620 to obtain another output sample $y(n)$ of the output signal y. In general, $y(n)$ is either equal to $d(n)$ or a value close to $d(n)$.

Moreover, y(n) is fed into adder 630. Furthermore, x* (n−1) is fed into the adder 630. As d(n) results from the subtraction d(n)=x(n)−x* (n−1), and as y(n) is a value equal to or at least close to d(n), the output x* (n) of the adder 630 is equal to x(n) or at least close to x(n).

x* (n) is held for a sampling period in unit 640, and then, processing is continued with the next sample x(n+1).

Figure 7:
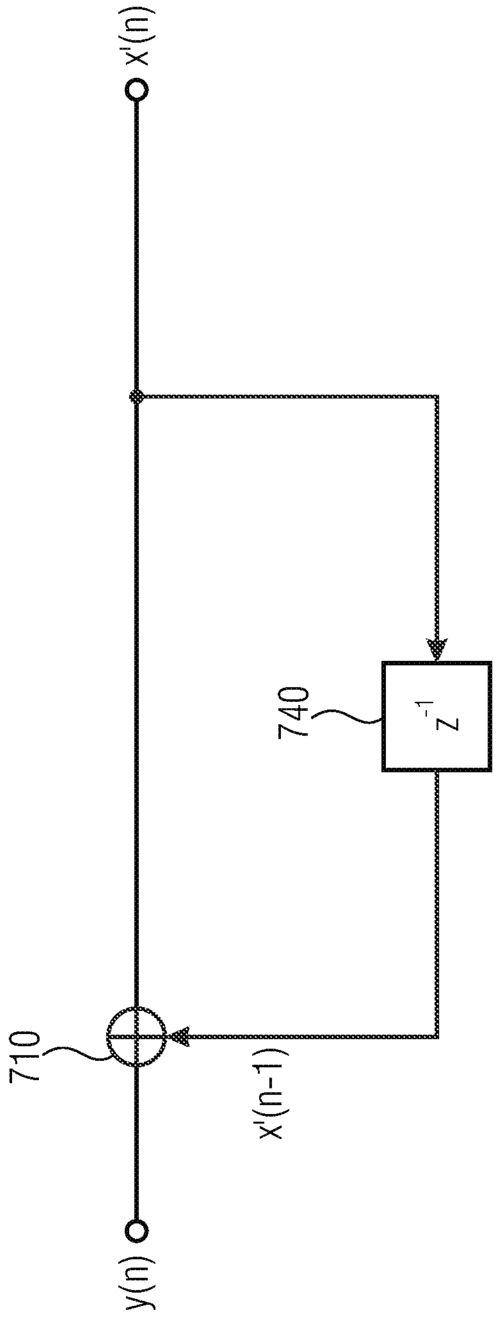
FIG. 7 illustrates a Differential Pulse Code Modulation decoder.

FIG. 7 shows a corresponding DPCM decoder.

In FIG. 7, a sample y(n) of the output signal y from the DPCM encoder is fed into adder 710. y(n) represents a difference value of the signal x(n) that shall be reconstructed. At the other input of the adder 710, the previously reconstructed sample x'(n−1) is fed into the adder 710. Output x'(n) of the adder results from the addition x'(n)=x'(n−1)+y(n). As x'(n−1) is, in general, equal to or at least close to x(n−1), and as y(n) is, in general, equal to or close to x(n)−x(n−1), the output x'(n) of the adder 710 is, in general, equal to or close to x(n).

x'(n) is hold for a sampling period in unit 740, and then, processing is continued with the next sample y(n+1).

While a DPCM compression method fulfills most of the previously stated necessitated features, it does not allow for random access.

Figure 8A:
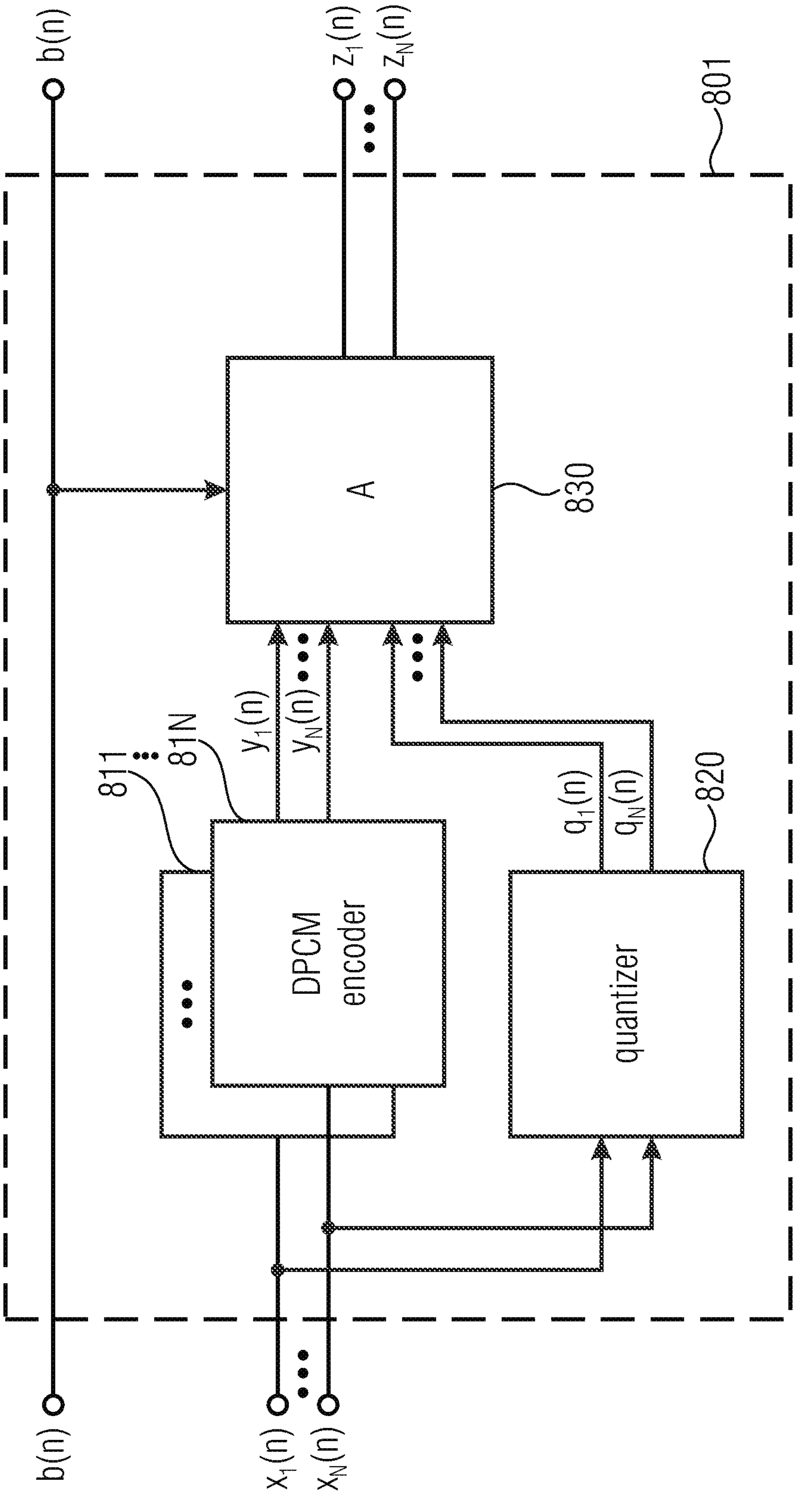
FIG. 8*a* illustrates a metadata encoder according to an embodiment.

FIG. 8*a* illustrates a metadata encoder 801 according to an embodiment.

The encoding method employed by the metadata encoder 801 of FIG. 8*a* is an extension of the classical DPCM encoding method.

The metadata encoder 801 of FIG. 8*a* comprises one or more DPCM encoder 811, . . . , 81N. For example, when the metadata encoder 801 is configured to receive N original metadata signals, the metadata encoder 801 may, for example, comprise exactly N DPCM encoder. In an embodiment, each of the N DPCM encoders is implemented as described with respect to FIG. 6.

In an embodiment, each of the N DPCM encoders is configured to receive the metadata samples $x_i(n)$ of one of the N original metadata signals $x_1, \ldots, x_N$, and generates a difference value as difference sample $y_i(n)$ of a metadata difference signal $y_i$ for each of the metadata samples $x_i(n)$ of said original metadata signal $x_i$, which is fed into said DPCM encoder. In an embodiment, generating the difference sample $y_i(n)$ may, for example, be conducted as described with reference to FIG. 6.

The metadata encoder 801 of FIG. 8*a* further comprises a selector 830 ("A"), which is configured to receive a control signal b(n).

The selector 830 is moreover, configured to receive the N metadata difference signals $y_1 \ldots y_N$.

Furthermore, in the embodiment of FIG. 8*a*, the metadata encoder 801 comprises a quantizer 820 which quantizes the N original metadata signals $x_1, \ldots, x_N$ to obtain N quantized metadata signals $q_1, \ldots, q_N$. In such an embodiment, the quantizer may be configured to feed the N quantized metadata signals into the selector 830.

The selector 830 may be configured to generate processed metadata signals $z_i$ from the quantized metadata signals $q_i$ and from the DPCM encoded difference metadata signals $y_i$ depending on the control signal b(n).

For example, when the control signal b is in a first state (e.g., b(n)=0), the selector 830 may be configured to output the difference samples $y_i(n)$ of the metadata difference signals $y_i$ as metadata samples $z_i(n)$ of the processed metadata signals $z_i$.

When the control signal b is in a second state, being different from the first state (e.g., b(n)=1), the selector 830 may be configured to output the metadata samples $q_i(n)$ of the quantized metadata signals $q_i$ as metadata samples $z_i(n)$ of the processed metadata signals $z_i$.

Figure 8B:
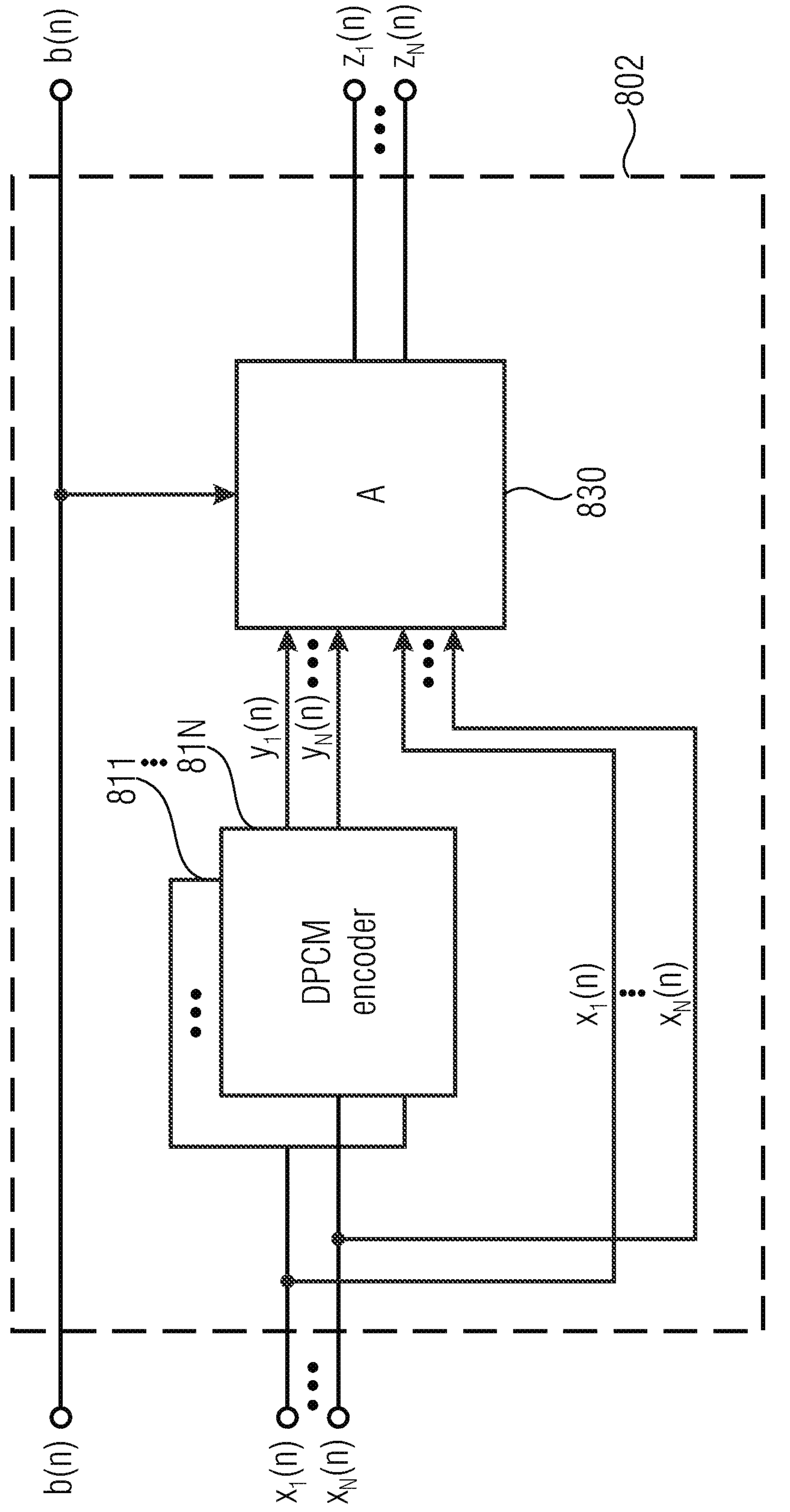
FIG. 8*b* illustrates a metadata encoder according to another embodiment.

FIG. 8*b* illustrates a metadata encoder 802 according to another embodiment.

In the embodiment of FIG. 8*b*, the metadata encoder 802 does not comprise the quantizer 820, and, instead of the N quantized metadata signals $q_1, \ldots, q_N$, the N original metadata signals $x_1, \ldots, x_N$ are directly fed into the selector 830.

In such an embodiment, when, for example, the control signal b is in a first state (e.g., b(n)=0), the selector 830 may be configured to output the difference samples $y_i(n)$ of the metadata difference signals $y_i$ as metadata samples $z_i(n)$ of the processed metadata signals $z_i$.

When the control signal b is in a second state, being different from the first state (e.g., b(n)=1), the selector 830 may be configured to output the metadata samples $x_i(n)$ of the original metadata signals $x_i$ as metadata samples $z_i(n)$ of the processed metadata signals $z_i$.

Figure 9A:
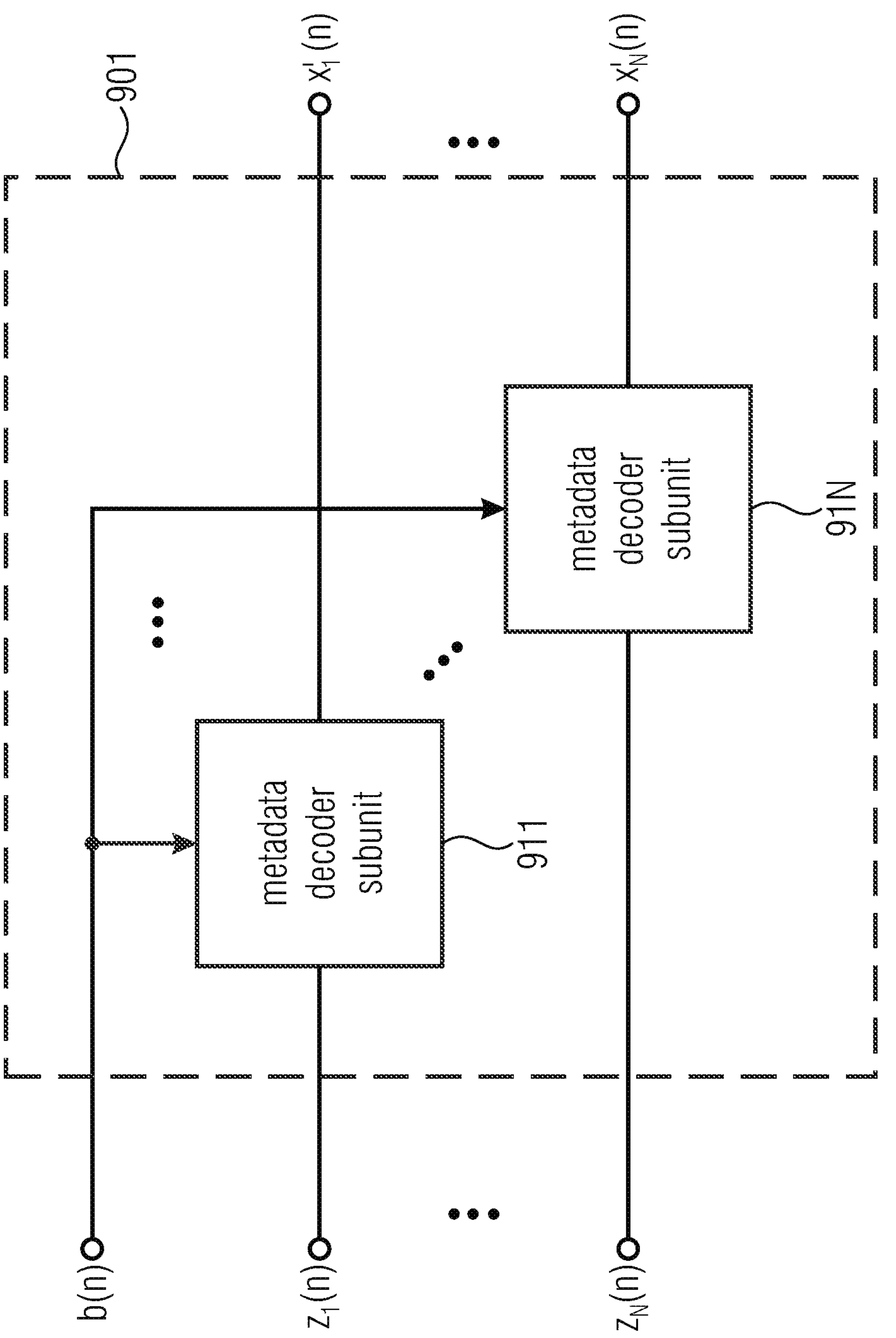
FIG. 9*a* illustrates a metadata decoder according to an embodiment.

FIG. 9*a* illustrates a metadata decoder 901 according to an embodiment. The metadata encoder according to FIG. 9*a* corresponds to the metadata encoders of FIG. 8*a* and FIG. 8*b*.

The metadata decoder 901 of FIG. 9*a* comprises one or more metadata decoder subunits 911, . . . , 91N. The metadata decoder 901 is configured to receive one or more processed metadata signals $z_1, \ldots, z_N$. Moreover, the metadata decoder 901 is configured to receive a control signal b. The metadata decoder is configured to generate one or more reconstructed metadata signals $x_1', \ldots x_N'$ from the one or more processed metadata signals $z_1, \ldots, z_N$ depending on the control signal b.

In an embodiment, each of the N processed metadata signals $z_1, \ldots, z_N$ is fed into a different one of the metadata decoder subunits 911, . . . , 91N. Moreover, according to an embodiment, the control signal b is fed into each of the metadata decoder subunits 911, . . . , 91N. According to an embodiment, the number of metadata decoder subunits 911, . . . , 91N is identical to the number of processed metadata signals $z_1, \ldots, z_N$ that are received be the metadata decoder 901.

Figure 9B:
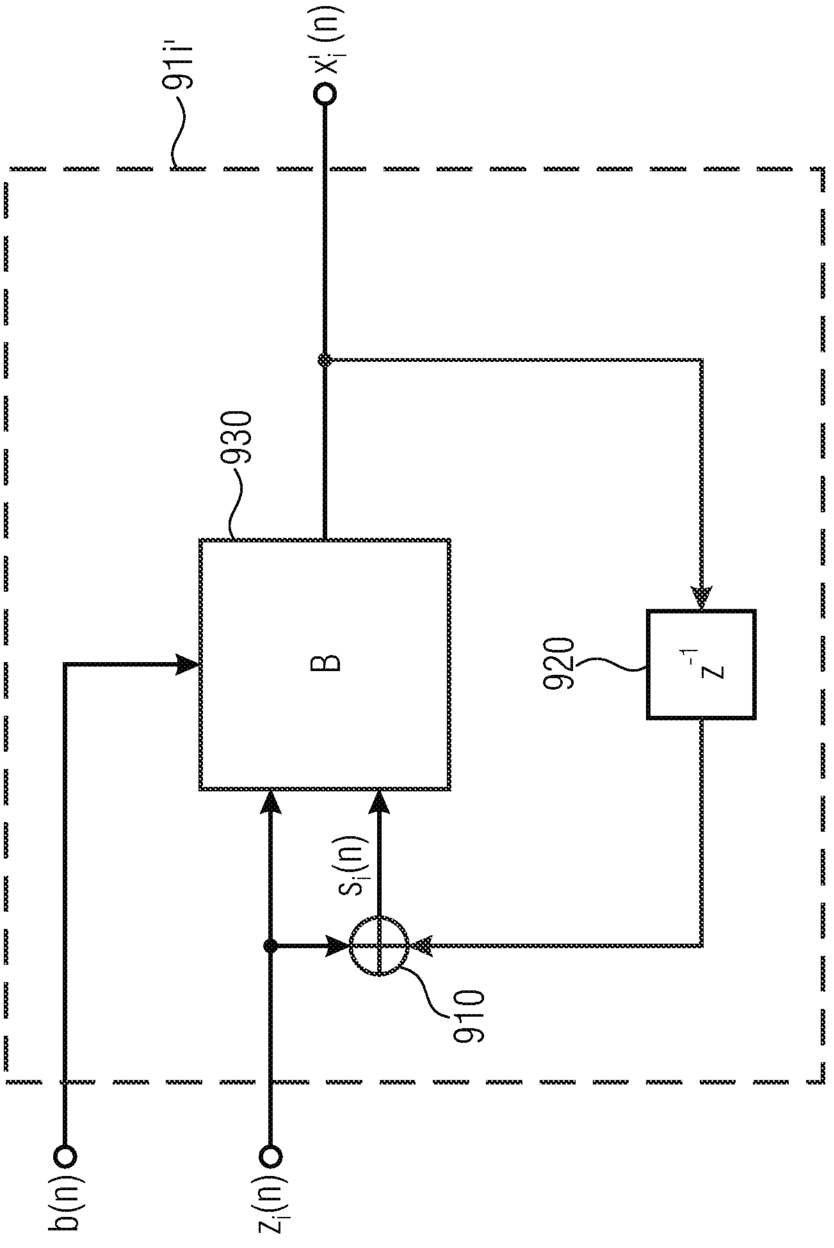
FIG. 9*b* illustrates a metadata decoder subunit according to an embodiment.

FIG. 9*b* illustrates a metadata decoder subunit (91*i*) of the metadata decoder subunits 911, . . . , 91N of FIG. 9*a* according to an embodiment. The metadata decoder subunit 91*i* is configured to conduct decoding for a single processed metadata signal $z_i$. The metadata decoder subunit 91*i* comprises a selector 930 ("B") and an adder 910.

The metadata decoder subunit 91*i* is configured to generate the reconstructed metadata signal $x_i'$ from the received processed metadata signal $z_i$ depending on the control signal b(n).

This may, for example, be realized as follows:

The last reconstructed metadata sample $x_i'(n-1)$ of the reconstructed metadata signal $x_i'$ is fed into the adder 910. Moreover, the actual metadata sample $z_i(n)$ of the processed metadata signal $z_i$ is also fed into the adder 910. The adder is configured to add the last reconstructed metadata sample $x_i'(n-1)$ and the actual metadata sample $z_i(n)$. to obtain a sum value $s_i(n)$ which is fed into the selector 930.

Moreover, the actual metadata sample $z_i(n)$ is also fed into the adder 930.

The selector is configured to select either the sum value $s_i(n)$ from the adder 910 or the actual metadata sample $z_i(n)$ as the actual metadata sample $x_i'(n)$ of the reconstructed metadata signal $x_i'(n)$ depending on the contral signal b.

When, for example, the control signal b is in a first state (e.g., b(n)=0), the control signal b indicates that the actual metadata sample $z_i(n)$ is a difference value, and so, the sum value $s_i(n)$ is the correct actual metadata sample $x_i'(n)$ of the reconstructed metadata signal $x_i'$. The selector 830 is configured to select the sum value $s_i(n)$ as the actual metadata sample $x_i'(n)$ of the reconstructed metadata signal $x_1'$, when the control signal is in the first state (when b(n)=0).

When the control signal b is in a second state, being different from the first state (e.g., b(n)=1), the control signal b indicates that the actual metadata sample $z_i(n)$ is not a difference value, and so, the actual metadata sample $z_i(n)$ is the correct actual metadata sample $x_i'(n)$ of the reconstructed metadata signal $x_i'$. The selector 830 is configured to select the actual metadata sample $z_i(n)$ as the actual metadata sample $x_i'(n)$ of the reconstructed metadata signal $x_i'$, when the control signal is in the second state (when b(n)=1).

According to embodiments, the metadata decoder subunit **91*i*' further comprises a unit 920. Unit 920** is configured to hold the actual metadata sample $x_i'(n)$ of the reconstructed metadata signal for the duration of a sampling period. In an embodiment, this ensures, that when $x_i'(n)$ is being generated, the generated x'(n) is not fed back too early, so that when $z_i(n)$ is a difference value, $x_i'(n)$ is really generated based on $x_i'(n-1)$.

In an embodiment of FIG. **9*b*, the selector 930** may generate the metadata samples xi'(n) from the received signal component $z_i(n)$ and the linear combination of the delayed output component (the already generated metadata sample of the reconstructed metadata signal) and the received signal component $z_i(n)$ depending on the control signal b(n).

In the following, the DPCM encoded signals are denoted as $y_i(n)$ and the second input signal (the sum signal) of B as $s_i(n)$. For output components that only depend on the corresponding input components, the encoder and decoder output is given as follows:

$$z_i(n)=A(x_i(n),v_i(n),b(n))$$

$$x_i'(n)=B(z_i(n),s_i(n),b(n))$$

A solution according to an embodiment for the general approach sketched above is to use b(n) to switch between the DPCM encoded signal and the quantized input signal. Omitting the time index n for simplicity reasons, the function blocks A and B are then given as follows:

In the metadata encoders 801, 802, the selector 830 (A) selects:

| | | |
|---|---|---|
| A: $z_i(x_i, y_i, b) = y_i$, | if b = 0 | ($z_i$ indicates a difference value) |
| A: $z_i(x_i, y_i, b) = x_i$, | if b = 1 | ($z_i$ does not indicate a difference value) |

In the metadata decoder subunits **91*i*, 91*i*', the selector 930** (B) selects:

| | | |
|---|---|---|
| B: $x_i'(z_i, s_i, b) = s_i$, | if b = 0 | ($z_i$ indicates a difference value) |
| B: $x_i'(z_i, s_i, b) = z_i$, | if b = 1 | ($z_i$ does not indicate a difference value) |

This allows to transmit the quantized input signal whenever b(n) is equal to 1 and to transmit a DPCM signal whenever b(n) is 0. In the latter case, the decoder becomes a DPCM decoder.

When applied for the transmission of object metadata, this mechanism is used to regularly transmit uncompressed object positions which can be used by the decoder for random access.

In embodiments, fewer bits are used for encoding the difference values than the number of bits used for encoding the metadata samples. These embodiments are based on the finding that (e.g., N) subsequent metadata samples in most times only vary slightly. For example, if one kind of metadata samples is encoded, e.g., by 8 bits, these metadata samples can take on one out of 256 different values. Because of the, in general, slight changes of (e.g., N) subsequent metadata values, it may be considered sufficient, to encode the difference values only, e.g., by 5 bits. Thus, even if difference values are transmitted, the number of transmitted bits can be reduced.

In an embodiment, the metadata encoder 210 is configured to encode each of the processed metadata samples ($z_i(1), \ldots, z_i(n)$) of one $z_i$ ( ) of the one or more processed metadata signals ($z_1, \ldots, z_N$) with a first number of bits when the control signal indicates the first state (b(n)=0), and with a second number of bits when the control signal indicates the second state (b(n)=1), wherein the first number of bits is smaller than the second number of bits.

In an embodiment, one or more difference values are transmitted, each of the one or more difference values is encoded with fewer bits than each of the metadata samples, and each of the difference value is an integer value.

According to an embodiment, the metadata encoder 110 is configured to encode one or more of the metadata samples of one of the one or more processed metadata signals with a first number of bits, wherein each of said one or more of the metadata samples of said one of the one or more processed metadata signals indicates an integer. Moreover metadata encoder (110) is configured to encode one or more of the difference values with a second number of bits, wherein each of said one or more of the difference values indicates an integer, wherein the second number of bits is smaller than the first number of bits.

Consider, for example, that in an embodiment, metadata samples may represent an azimuth being encoded by 8 bits. E.g., the azimuth may be an integer between $-90 \leq \text{azimuth} \leq 90$. Thus, the azimuth can take on 181 different values. If however, one can assume that (e.g. N) subsequent azimuth samples only differ by no more than, e.g., ±15, then, 5 bits ($2^5=32$) may be enough to encode the difference values. If difference values are represented as integers, then determining the difference values automatically transforms the additional values, to be transmitted, to a suitable value range.

For example, consider a case where a first azimuth value of a first audio object is 60° and its subsequent values vary from 45° to 75°. Moreover, consider that a second azimuth value of a second audio object is −30° and its subsequent values vary from −45° to −15°. By determining difference values for both the subsequent values of the first audio object and for both the subsequent values of the second audio object, the difference values of the first azimuth value and of the second azimuth value are both in the value range from −15° to +15°, so that 5 bits are sufficient to encode each of the difference values and so that the bit sequence, which encodes the difference values, has the same meaning for difference values of the first azimuth angle and difference values of the second azimuth value.

In the following, object metadata frames according to embodiments and symbol representation according to embodiments are described.

The encoded object metadata is transmitted in frames. These object metadata frames may contain either intracoded object data or dynamic object data where the latter contains the changes since the last transmitted frame.

Some or all portions of the following syntax for object metadata frames may, for example, be employed:

| | No. of bits | Mnemonic |
|---|---|---|
| object_metadata( ) | | |
| { | | |
| has_intracoded_object_metadata; | 1 | bslbf |
| if (has_intracoded_object_metadata) { | | |
| intracoded_object_metadata ( ); | | |
| } | | |
| else { | | |
| dynamic_object_metadata( ); | | |
| } | | |
| } | | |

In the following, intracoded object data according to an embodiment is described.

Random access of the encoded object metadata is realized via intracoded object data ("I-Frames") which contain the quantized values sampled on a regular grid (e.g. every 32 frames of length 1024). These I-Frames may, for example, have the following syntax, where position_azimuth, position_elevation, position_radius, and gain_factor specify the current quantized values:

| | No. of bits | Mnemonic |
|---|---|---|
| intracoded_object_metadata( ) | | |
| { | | |
| if (num_objects>1) { | | |
| fixed_azimuth; | 1 | bslbf |
| if (fixed_azimuth) { | | |
| default_azimuth; | 8 | tcimsbf |
| } | | |
| else { | | |
| common_azimuth; | 1 | bslbf |
| if (common_azimuth) { | | |
| default_azimuth; | 8 | tcimsbf |
| } | | |
| else { | | |
| for (o=1:num_objects) { | | |
| position_azimuth[o]; | 8 | tcimsbf |
| } | | |
| } | | |
| } | | |
| fixed_elevation; | 1 | bslbf |
| if (fixed_azimuth) { | | |
| default_elevation; | 6 | tcimsbf |
| } | | |
| else { | | |
| common_ elevation; | 1 | bslbf |
| if (common_azimuth) { | | |
| default_elevation; | 6 | tcimsbf |
| } | | |
| else { | | |
| for (o=1:num_objects) { | | |
| position_azimuth[o]; | 6 | tcimsbf |
| } | | |
| } | | |
| } | | |
| fixed_radius: | 1 | bslbf |
| if (fixed_azimuth) { | | |
| default_radius; | 4 | tcimsbf |
| } | | |
| else { | | |
| common_ radius; | 1 | bslbf |
| if (common_azimuth) { | | |
| default_radius; | 4 | tcimsbf |
| } | | |
| else { | | |
| for (o=1:num_objects) { | | |
| position_ radius [o]; | 4 | tcimsbf |
| } | | |
| } | | |
| } | | |

-continued

| | No. of bits | Mnemonic |
|---|---|---|
| fixed_gain; | 1 | bslbf |
| if (fixed_azimuth) { | | |
| default_gain; | 7 | tcimsbf |
| } | | |
| else { | | |
| common_ gain; | 1 | bslbf |
| if (common_azimuth) { | | |
| default_gain; | 7 | tcimsbf |
| } | | |
| else { | | |
| for (o=1:num_objects) { | | |
| gain_factor [o]; | 7 | tcimsbf |
| } | | |
| } | | |
| } | | |
| } | | |
| else { | | |
| position_azimuth; | 8 | tcimsbf |
| position_elevation; | 6 | tcimsbf |
| position_radius: | 4 | tcimsbf |
| gain_factor; | 7 | tcimsbf |
| } | | |
| } | | |

In the following, dynamic object data according to an embodiment is described.

DPCM data is transmitted in dynamic object frames which may, for example, have the following syntax:

| | No. of bits | Mnemonic |
|---|---|---|
| dynamic_object_metadata( ) | | |
| { | | |
| flag_absolute: | 1 | bslbf |
| for (o=1:num_objects) { | | |
| has_object_metadata; | 1 | bslbf |
| if (has_object_metadata) { | | |
| single_dynamic_object_metadata( flag_absolute ); | | |
| } | | |
| } | | |
| } | | |

| | No. of bits | Mnemonic |
|---|---|---|
| single_dynamic_object_metadata ( flag_absolute ) { | | |
| if ( flag_absolute ) { | | |
| if (!fixed_azimuth*) { | | |
| position_azimuth; | 8 | tcimsbf |
| } | | |
| if (!fixed_elevation*) { | | |
| position_elevation; | 6 | tcimsbf |
| } | | |
| if (!fixed_radius*) { | | |
| position_radius; | 4 | tcimsbf |
| } | | |
| if (!fixed_gain*) { | | |
| gain_ factor; | 7 | tcimsbf |
| } | | |
| } | | |
| else { | | |
| nbits; | 3 | uimsbf |
| if (!fixed_azimuth*) { | | |
| flag_azimuth; | 1 | bslbf |
| if (flag_azimuth) { | | |
| position_azimuth_difference ; | num_bits | tcimsbf |
| } | | |
| if (!fixed_elevation*) { | | |
| flag_elevation; | 1 | bslbf |

-continued

| | No. of bits | Mnemonic |
|---|---|---|
| if (flag_elevation) { | | |
| position_elevation_difference ; | min(num_bits, 7) | tcimsbf |
| } | | |
| } | | |
| if (!fixed_radius*) { | | |
| flag_radius; | 1 | bslbf |
| if (flag_radius) { | | |
| position_radius_difference ; | min(num_bits, 5) | tcimsbf |
| } | | |
| } | | |
| if (!fixed_gain*) { | | |
| flag_gain; | 1 | bslbf |
| if (flag_gain) { | | |
| gain_factor_difference ; | min(num_bits, 8) | tcimsbf |
| } | | |
| } | | |

Note:
num_bits = nbits + 2;
Footnote *Given by the preceding intracoded_object_data( )-frame In particular, in an embodiment, the above macros may, e.g., have the following meaning:

Definition of object_data( ) payloads according to an embodiment:

| | |
|---|---|
| has_intracoded_object_metadata | indicates whether the frame is intracoded or differentially coded. |

Definition of intracoded_object_metadata( ) payloads according to an embodiment:

| | |
|---|---|
| fixed_azimuth | flag indicating whether the azimuth value is fixed for all object and not transmitted in case of dynamic_object_metadata( ) |
| default_azimuth | defines the value of the fixed or common azimuth angle |
| common_azimuth | indicates whether a common azimuth angle is used is used for all objects |
| position_azimuth | if there is no common azimuth value, a value for each object is transmitted |
| fixed_elevation | flag indicating whether the elevation value is fixed for all object and not transmitted in case of dynamic_object_metadata( ) |
| default_elevation | defines the value of the fixed or common elevation angle |
| common_elevation | indicates whether a common elevation angle is used for all objects |
| position_elevation | if there is no common elevation value, a value for each object is transmitted |
| fixed_radius | flag indicating whether the radius is fixed for all object and not transmitted in case of dynamic_object_metadata( ) |
| default_radius | defines the value of the common radius |
| common_radius | indicates whether a common radius value is used for all objects |
| position_radius | if there is no common radius value, a value for each object is transmitted |
| fixed_gain | flag indicating whether the gain factor is fixed for all object and not transmitted in case of dynamic_object_metadata( ) |
| default_gain | defines the value of the fixed or common gain factor |
| common_gain | indicates whether a common gain value is used for all objects |
| gain_factor | if there is no common gain value, a value for each object is transmitted |
| position_azimuth | if there is only one object, this is its azimuth angle |
| position_elevation | if there is only one object, this is its elevation angle |
| position_radius | if there is only one object, this is its radius |
| gain_factor | if there is only one object, this is its gain factor |

Definition of dynamic_object_metadata( ) payloads according to an embodiment:

| | |
|---|---|
| flag_absolute | indicates whether the values of the components are transmitted differentially or in absolute values |
| has_object_metadata | indicates whether there are object data present in the bit stream or not |

Definition of single_dynamic_object_metadata( ) payloads according to an embodiment:

| | |
|---|---|
| position_azimuth | the absolute value of the azimuth angle if the value is not fixed |
| position_elevation | the absolute value of the elevation angle if the value is not fixed |
| position_radius | the absolute value of the radius if the value is not fixed |
| gain_factor | the absolute value of the gain factor if the value is not fixed |
| nbits | how many bits are necessitated to represent the differential values |
| flag_azimuth | flag per object indicating whether the azimuth value changes |
| position_azimuth_difference | difference between the previous and the active value |
| flag_elevation | flag per object indicating whether the elevation value changes |
| position_elevation_difference | value of the difference between the previous and the active value |
| flag_radius | flag per object indicating whether the radius changes |
| position_radius_difference | difference between the previous and the active value |
| flag_gain | flag per object indicating whether the gain radius changes |
| gain_factor_difference | difference between the previous and the active value |

In conventional technology, no flexible technology exists combining channel coding on the one hand and object coding on the other hand so that acceptable audio qualities at low bit rates are obtained.

This limitation is overcome by the 3D Audio Codec System. Now, the 3D Audio Codec System is described.

Figure 10:
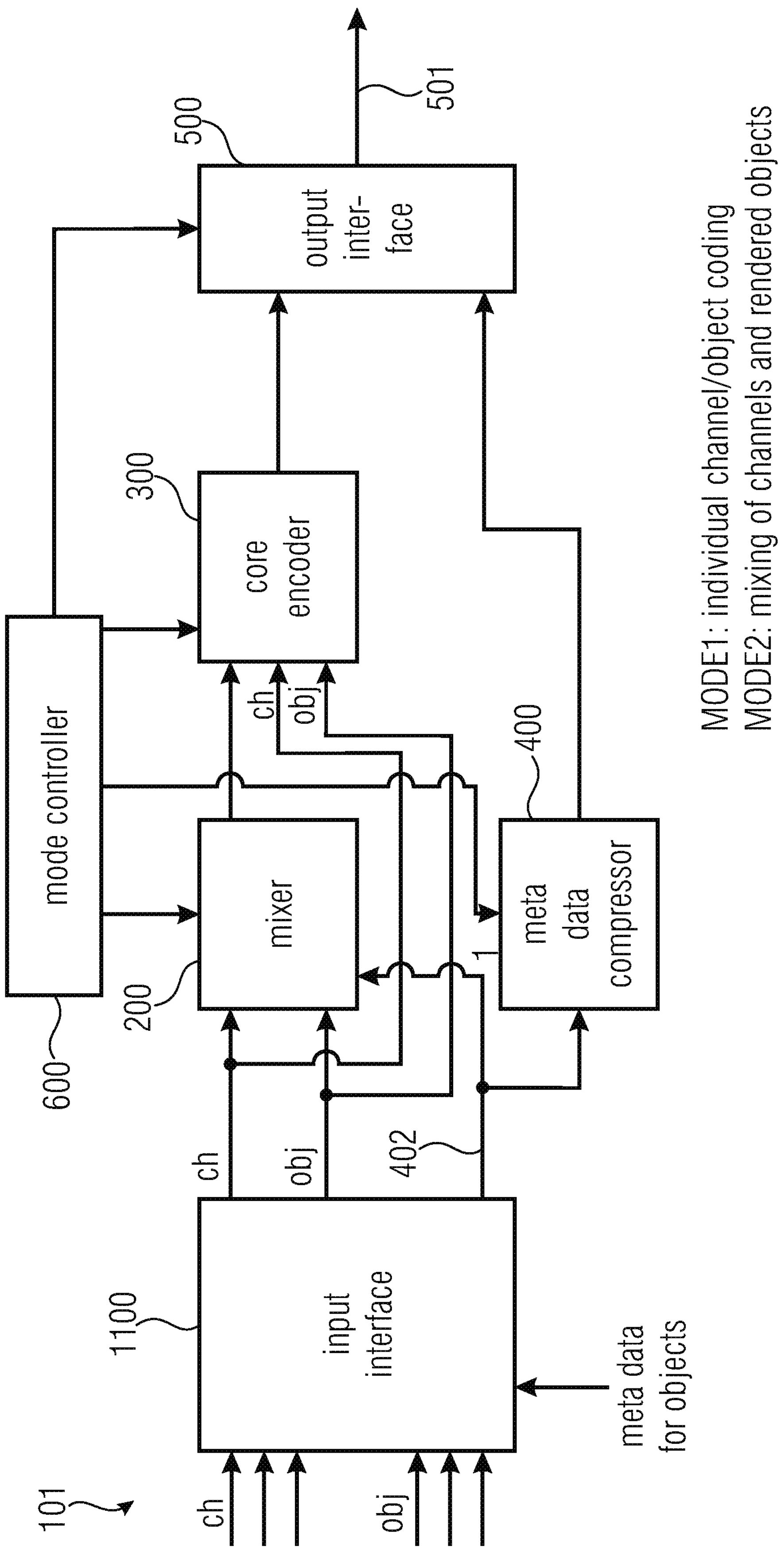
FIG. 10 illustrates a first embodiment of a 3D audio encoder.

FIG. 10 illustrates a 3D audio encoder in accordance with an embodiment of the present invention. The 3D audio encoder is configured for encoding audio input data 101 to obtain audio output data 501. The 3D audio encoder comprises an input interface for receiving a plurality of audio channels indicated by CH and a plurality of audio objects indicated by OBJ. Furthermore, as illustrated in FIG. 10, the input interface 1100 additionally receives metadata related to one or more of the plurality of audio objects OBJ. Furthermore, the 3D audio encoder comprises a mixer 200 for mixing the plurality of objects and the plurality of channels to obtain a plurality of pre-mixed channels, wherein each pre-mixed channel comprises audio data of a channel and audio data of at least one object.

Furthermore, the 3D audio encoder comprises a core encoder 300 for core encoding core encoder input data, a metadata compressor 400 for compressing the metadata related to the one or more of the plurality of audio objects.

Furthermore, the 3D audio encoder can comprise a mode controller 600 for controlling the mixer, the core encoder and/or an output interface 500 in one of several operation modes, wherein in the first mode, the core encoder is configured to encode the plurality of audio channels and the plurality of audio objects received by the input interface 1100 without any interaction by the mixer, i.e., without any mixing by the mixer 200. In a second mode, however, in which the mixer 200 was active, the core encoder encodes the plurality of mixed channels, i.e., the output generated by block 200. In this latter case, it is advantageous to not encode any object data anymore. Instead, the metadata indicating positions of the audio objects are already used by the mixer 200 to render the objects onto the channels as indicated by the metadata. In other words, the mixer 200 uses the metadata related to the plurality of audio objects to pre-render the audio objects and then the pre-rendered audio objects are mixed with the channels to obtain mixed channels at the output of the mixer. In this embodiment, any objects may not necessarily be transmitted and this also applies for compressed metadata as output by block 400. However, if not all objects input into the interface 1100 are mixed but only a certain amount of objects is mixed, then only the remaining non-mixed objects and the associated metadata nevertheless are transmitted to the core encoder 300 or the metadata compressor 400, respectively.

In FIG. 10, the meta data compressor 400 is the metadata encoder 210 of an apparatus 250 for generating encoded audio information according to one of the above-described embodiments. Moreover, in FIG. 10, the mixer 200 and the core encoder 300 together form the audio encoder 220 of an apparatus 250 for generating encoded audio information according to one of the above-described embodiments.

Figure 12:
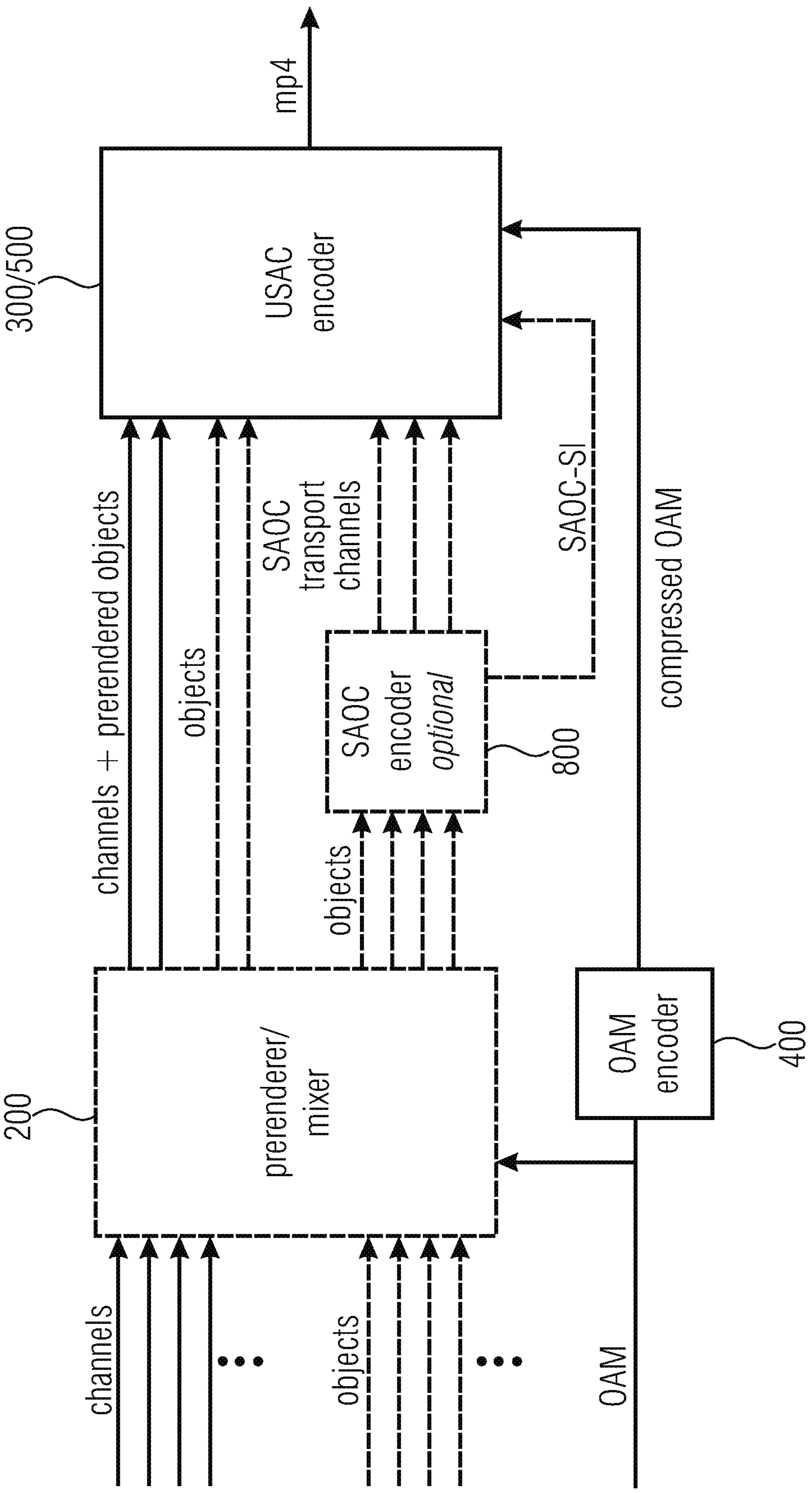
FIG. 12 illustrates a second embodiment of a 3D audio encoder.

FIG. 12 illustrates a further embodiment of an 3D audio encoder which, additionally, comprises an SAOC encoder 800. The SAOC encoder 800 is configured for generating one or more transport channels and parametric data from spatial audio object encoder input data. As illustrated in FIG. 12, the spatial audio object encoder input data are objects which have not been processed by the pre-renderer/mixer. Alternatively, provided that the pre-renderer/mixer has been bypassed as in the mode one where an individual channel/object coding is active, all objects input into the input interface 1100 are encoded by the SAOC encoder 800.

Furthermore, as illustrated in FIG. 12, the core encoder 300 is implemented as a USAC encoder, i.e., as an encoder as defined and standardized in the MPEG-USAC standard (USAC=unified speech and audio coding). The output of the whole 3D audio encoder illustrated in FIG. 12 is an MPEG 4 data stream having the container-like structures for individual data types. Furthermore, the metadata is indicated as "OAM" data and the metadata compressor 400 in FIG. 10 corresponds to the OAM encoder 400 to obtain compressed OAM data which are input into the USAC encoder 300 which, as can be seen in FIG. 12, additionally comprises the output interface to obtain the MP4 output data stream not only having the encoded channel/object data but also having the compressed OAM data.

In FIG. 12, the OAM encoder 400 is the metadata encoder 210 of an apparatus 250 for generating encoded audio information according to one of the above-described embodiments. Moreover, in FIG. 12, the SAOC encoder 800 and the USAC encoder 300 together form the audio encoder 220 of an apparatus 250 for generating encoded audio information according to one of the above-described embodiments.

Figure 14:
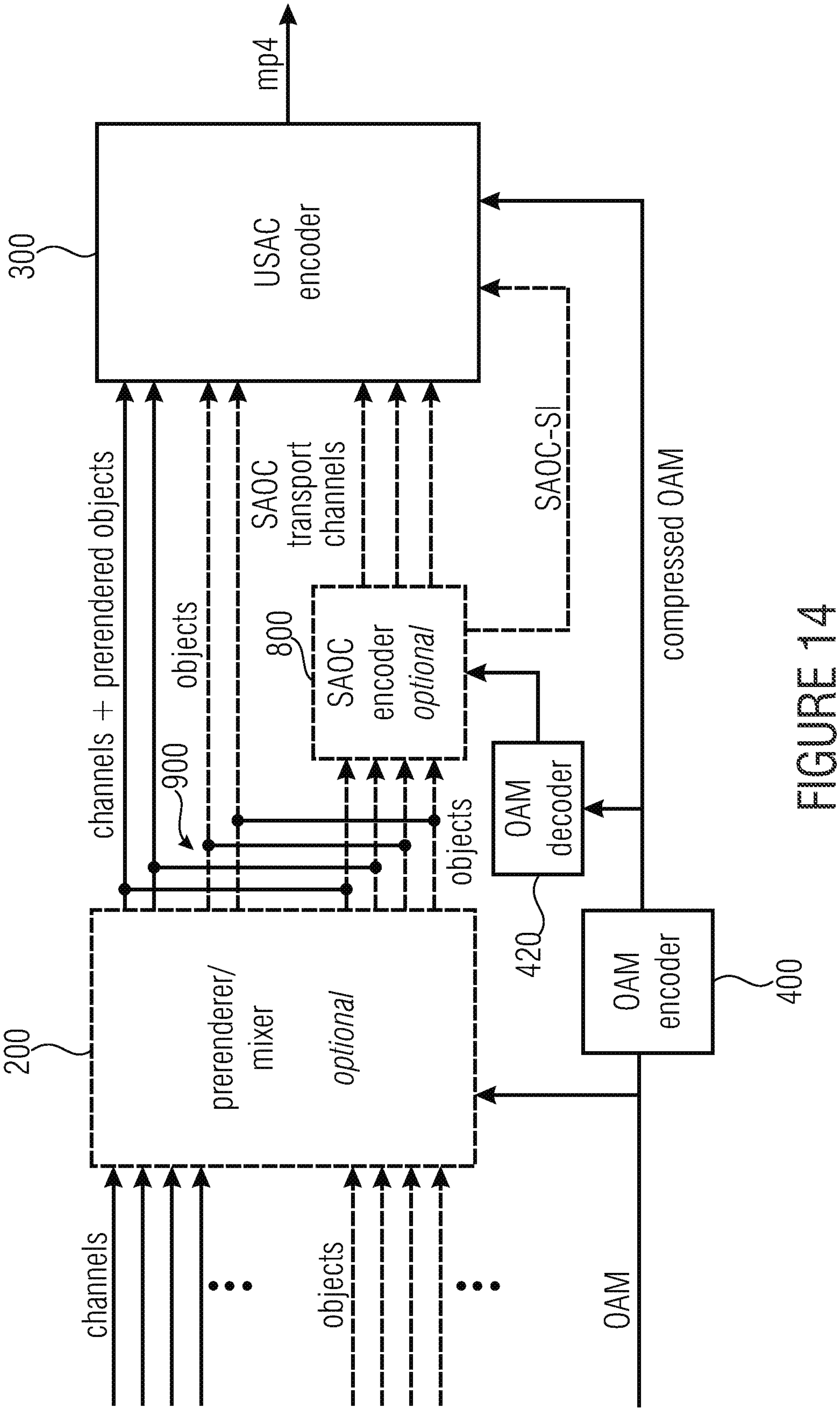
FIG. 14 illustrates a third embodiment of a 3D audio encoder.

FIG. 14 illustrates a further embodiment of the 3D audio encoder, where in contrast to FIG. 12, the SAOC encoder can be configured to either encode, with the SAOC encoding algorithm, the channels provided at the pre-renderer/mixer 200 not being active in this mode or, alternatively, to SAOC encode the pre-rendered channels plus objects. Thus, in FIG. 14, the SAOC encoder 800 can operate on three different kinds of input data, i.e., channels without any pre-rendered objects, channels and pre-rendered objects or objects alone. Furthermore, it is advantageous to provide an additional OAM decoder 420 in FIG. 14 so that the SAOC encoder 800 uses, for its processing, the same data as on the decoder side, i.e., data obtained by a lossy compression rather than the original OAM data.

The FIG. 14 3D audio encoder can operate in several individual modes.

In addition to the first and the second modes as discussed in the context of FIG. 10, the FIG. 14 3D audio encoder can additionally operate in a third mode in which the core encoder generates the one or more transport channels from the individual objects when the pre-renderer/mixer 200 was not active. Alternatively or additionally, in this third mode the SAOC encoder 800 can generate one or more alternative or additional transport channels from the original channels, i.e., again when the pre-renderer/mixer 200 corresponding to the mixer 200 of FIG. 10 was not active.

Finally, the SAOC encoder 800 can encode, when the 3D audio encoder is configured in the fourth mode, the channels plus pre-rendered objects as generated by the pre-renderer/mixer. Thus, in the fourth mode the lowest bit rate applications will provide good quality due to the fact that the channels and objects have completely been transformed into individual SAOC transport channels and associated side information as indicated in FIGS. 3 and 5 as "SAOC-SI" and, additionally, any compressed metadata do not have to be transmitted in this fourth mode.

In FIG. 14, the OAM encoder 400 is the metadata encoder 210 of an apparatus 250 for generating encoded audio information according to one of the above-described embodiments. Moreover, in FIG. 14, the SAOC encoder 800 and the USAC encoder 300 together form the audio encoder 220 of an apparatus 250 for generating encoded audio information according to one of the above-described embodiments.

According to an embodiment, an apparatus for encoding audio input data 101 to obtain audio output data 501 is provided. The apparatus for encoding audio input data 101 comprises:

- an input interface 1100 for receiving a plurality of audio channels, a plurality of audio objects and metadata related to one or more of the plurality of audio objects,
- a mixer 200 for mixing the plurality of objects and the plurality of channels to obtain a plurality of pre-mixed channels, each pre-mixed channel comprising audio data of a channel and audio data of at least one object, and
- an apparatus 250 for generating encoded audio information which comprises a metadata encoder and an audio encoder as described above.

The audio encoder 220 of the apparatus 250 for generating encoded audio information is a core encoder (300) for core encoding core encoder input data.

The metadata encoder 210 of the apparatus 250 for generating encoded audio information is a metadata compressor 400 for compressing the metadata related to the one or more of the plurality of audio objects.

Figure 11:
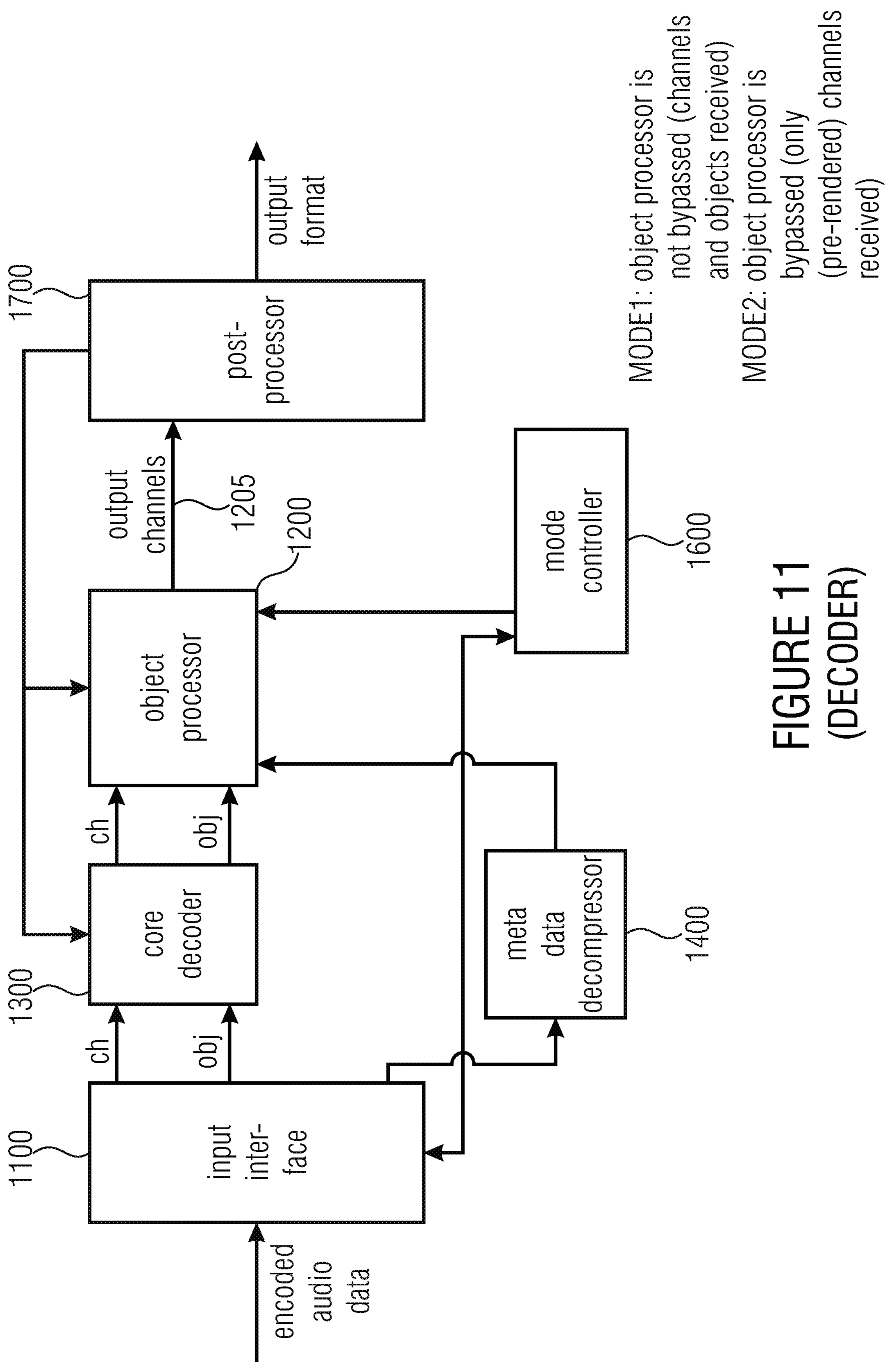
FIG. 11 illustrates a first embodiment of a 3D audio decoder.

FIG. 11 illustrates a 3D audio decoder in accordance with an embodiment of the present invention. The 3D audio decoder receives, as an input, the encoded audio data, i.e., the data 501 of FIG. 10.

The 3D audio decoder comprises a metadata decompressor 1400, a core decoder 1300, an object processor 1200, a mode controller 1600 and a postprocessor 1700.

Specifically, the 3D audio decoder is configured for decoding encoded audio data and the input interface is configured for receiving the encoded audio data, the encoded audio data comprising a plurality of encoded channels and the plurality of encoded objects and compressed metadata related to the plurality of objects in a certain mode.

Furthermore, the core decoder 1300 is configured for decoding the plurality of encoded channels and the plurality of encoded objects and, additionally, the metadata decompressor is configured for decompressing the compressed metadata.

Furthermore, the object processor 1200 is configured for processing the plurality of decoded objects as generated by the core decoder 1300 using the decompressed metadata to obtain a predetermined number of output channels comprising object data and the decoded channels. These output channels as indicated at 1205 are then input into a postprocessor 1700. The postprocessor 1700 is configured for converting the number of output channels 1205 into a certain output format which can be a binaural output format or a loudspeaker output format such as a 5.1, 7.1, etc., output format.

The 3D audio decoder comprises a mode controller 1600 which is configured for analyzing the encoded data to detect a mode indication. Therefore, the mode controller 1600 is connected to the input interface 1100 in FIG. 11. However, alternatively, the mode controller does not necessarily have to be there. Instead, the flexible audio decoder can be pre-set by any other kind of control data such as a user input or any other control. The 3D audio decoder in FIG. 11 and, controlled by the mode controller 1600, is configured to either bypass the object processor and to feed the plurality of decoded channels into the postprocessor 1700. This is the operation in mode 2, i.e., in which only pre-rendered channels are received, i.e., when mode 2 has been applied in the 3D audio encoder of FIG. 10. Alternatively, when mode 1 has been applied in the 3D audio encoder, i.e., when the 3D audio encoder has performed individual channel/object coding, then the object processor 1200 is not bypassed, but the plurality of decoded channels and the plurality of decoded objects are fed into the object processor 1200 together with decompressed metadata generated by the metadata decompressor 1400.

The indication whether mode 1 or mode 2 is to be applied is included in the encoded audio data and then the mode controller 1600 analyses the encoded data to detect a mode indication. Mode 1 is used when the mode indication indicates that the encoded audio data comprises encoded channels and encoded objects and mode 2 is applied when the mode indication indicates that the encoded audio data does not contain any audio objects, i.e., only contain pre-rendered channels obtained by mode 2 of the FIG. 10 3D audio encoder.

In FIG. 11, the meta data decompressor 1400 is the metadata decoder 110 of an apparatus 100 for generating one or more audio channels according to one of the above-described embodiments. Moreover, in FIG. 11, the core decoder 1300, the object processor 1200 and the post processor 1700 together form the audio decoder 120 of an apparatus 100 for generating one or more audio channels according to one of the above-described embodiments.

Figure 13:
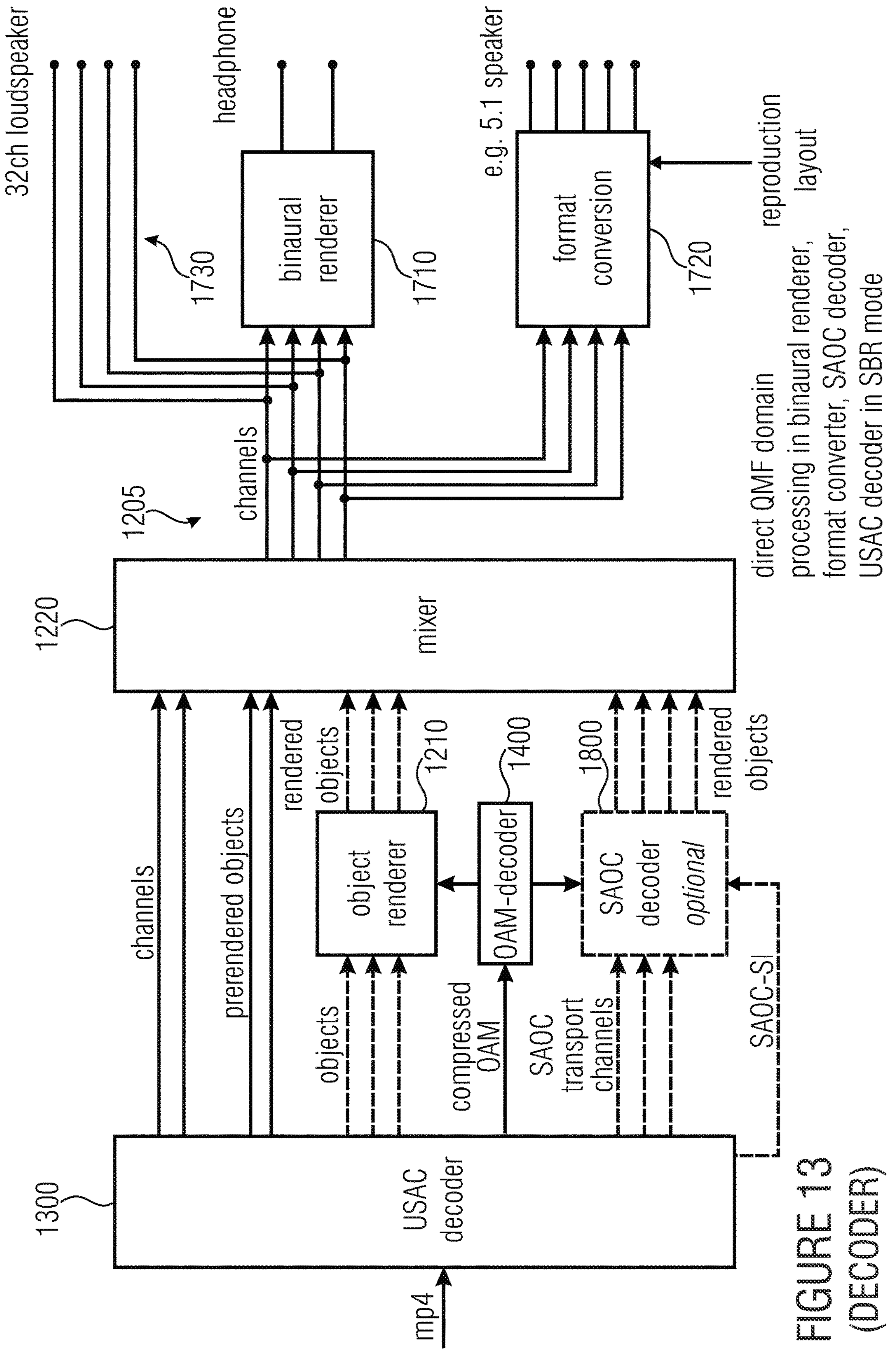
FIG. 13 illustrates a second embodiment of a 3D audio decoder.

FIG. 13 illustrates an embodiment compared to the FIG. 11 3D audio decoder and the embodiment of FIG. 13 corresponds to the 3D audio encoder of FIG. 12. In addition to the 3D audio decoder implementation of FIG. 11, the 3D audio decoder in FIG. 13 comprises an SAOC decoder 1800. Furthermore, the object processor 1200 of FIG. 11 is implemented as a separate object renderer 1210 and the mixer 1220 while, depending on the mode, the functionality of the object renderer 1210 can also be implemented by the SAOC decoder 1800.

Furthermore, the postprocessor 1700 can be implemented as a binaural renderer 1710 or a format converter 1720. Alternatively, a direct output of data 1205 of FIG. 11 can also be implemented as illustrated by 1730. Therefore, it is advantageous to perform the processing in the decoder on the highest number of channels such as 22.2 or 32 in order to have flexibility and to then post-process if a smaller format is necessitated. However, when it becomes clear from the very beginning that only small format such as a 5.1 format is necessitated, then it is advantageous, as indicated by FIG. 11 or 6 by the shortcut 1727, that a certain control over the SAOC decoder and/or the USAC decoder can be applied in order to avoid unnecessitated upmixing operations and subsequent downmixing operations.

In an embodiment of the present invention, the object processor 1200 comprises the SAOC decoder 1800 and the SAOC decoder is configured for decoding one or more transport channels output by the core decoder and associated parametric data and using decompressed metadata to obtain the plurality of rendered audio objects. To this end, the OAM output is connected to box 1800.

Furthermore, the object processor 1200 is configured to render decoded objects output by the core decoder which are not encoded in SAOC transport channels but which are individually encoded in typically single channeled elements as indicated by the object renderer 1210. Furthermore, the decoder comprises an output interface corresponding to the output 1730 for outputting an output of the mixer to the loudspeakers.

In a further embodiment, the object processor 1200 comprises a spatial audio object coding decoder 1800 for decoding one or more transport channels and associated parametric side information representing encoded audio signals or encoded audio channels, wherein the spatial audio object coding decoder is configured to transcode the associated parametric information and the decompressed metadata into transcoded parametric side information usable for directly rendering the output format, as for example defined in an earlier version of SAOC. The postprocessor 1700 is configured for calculating audio channels of the output format using the decoded transport channels and the transcoded parametric side information. The processing performed by the post processor can be similar to the MPEG Surround processing or can be any other processing such as BCC processing or so.

In a further embodiment, the object processor 1200 comprises a spatial audio object coding decoder 1800 configured to directly upmix and render channel signals for the output format using the decoded (by the core decoder) transport channels and the parametric side information Furthermore, and importantly, the object processor 1200 of FIG. 11 additionally comprises the mixer 1220 which receives, as an input, data output by the USAC decoder 1300 directly when pre-rendered objects mixed with channels exist, i.e., when the mixer 200 of FIG. 10 was active. Additionally, the mixer 1220 receives data from the object renderer performing object rendering without SAOC decoding. Furthermore, the mixer receives SAOC decoder output data, i.e., SAOC rendered objects.

The mixer 1220 is connected to the output interface 1730, the binaural renderer 1710 and the format converter 1720. The binaural renderer 1710 is configured for rendering the output channels into two binaural channels using head related transfer functions or binaural room impulse responses (BRIR). The format converter 1720 is configured for converting the output channels into an output format having a lower number of channels than the output channels 1205 of the mixer and the format converter 1720 necessitates information on the reproduction layout such as 5.1 speakers or so.

In FIG. 13, the OAM-Decoder 1400 is the metadata decoder 110 of an apparatus 100 for generating one or more audio channels according to one of the above-described embodiments. Moreover, in FIG. 13, the Object Renderer 1210, the USAC decoder 1300 and the mixer 1220 together form the audio decoder 120 of an apparatus 100 for generating one or more audio channels according to one of the above-described embodiments.

Figure 15:
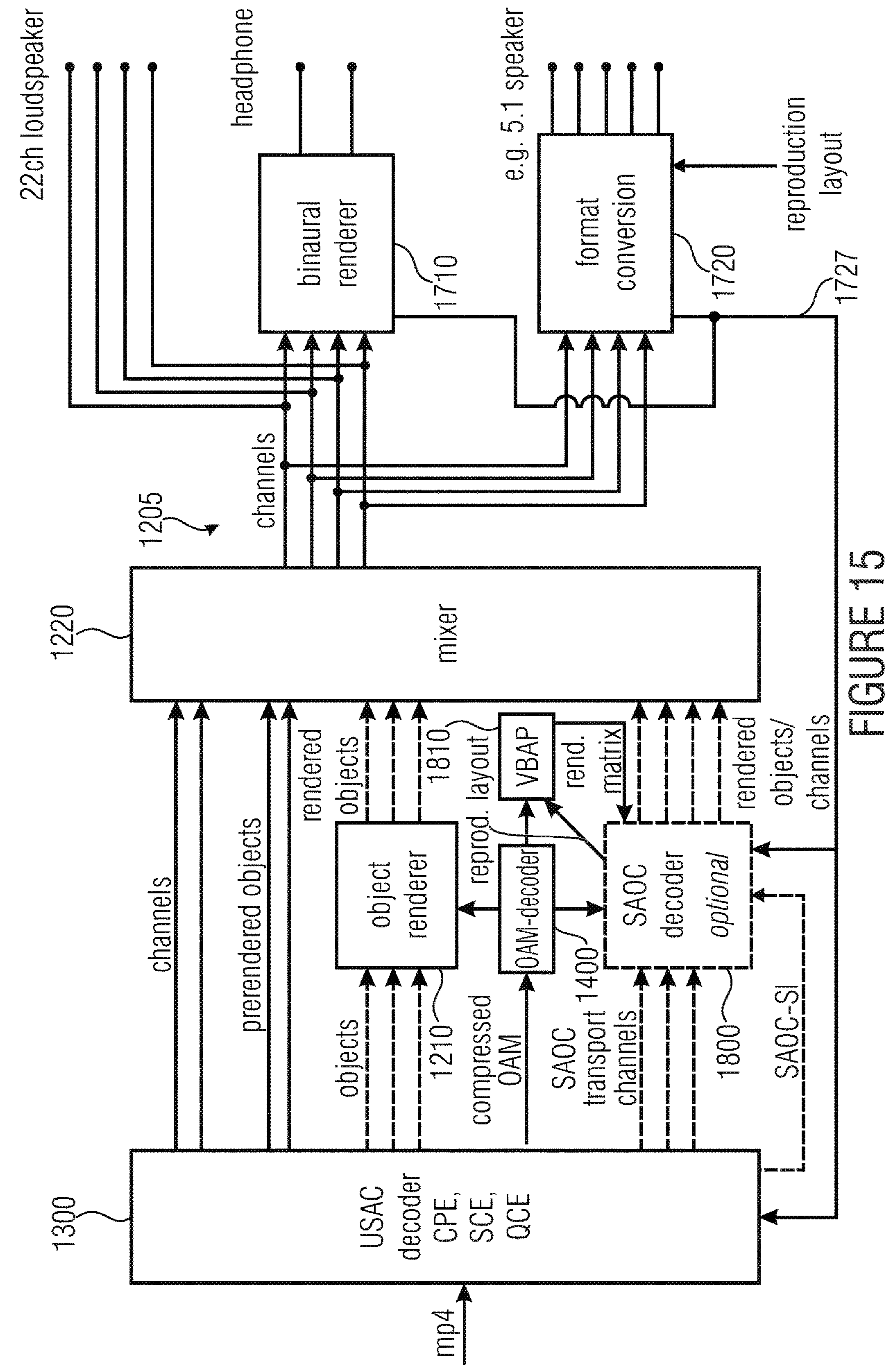
FIG. 15 illustrates a third embodiment of a 3D audio decoder.

The FIG. 15 3D audio decoder is different from the FIG. 13 3D audio decoder in that the SAOC decoder cannot only generate rendered objects but also rendered channels and this is the case when the FIG. 14 3D audio encoder has been used and the connection 900 between the channels/pre-rendered objects and the SAOC encoder 800 input interface is active.

Furthermore, a vector base amplitude panning (VBAP) stage 1810 is configured which receives, from the SAOC decoder, information on the reproduction layout and which outputs a rendering matrix to the SAOC decoder so that the SAOC decoder can, in the end, provide rendered channels without any further operation of the mixer in the high channel format of 1205, i.e., 32 loudspeakers.

the VBAP block receives the decoded OAM data to derive the rendering matrices. More general, it necessitates geometric information not only of the reproduction layout but also of the positions where the input signals should be rendered to on the reproduction layout. This geometric input data can be OAM data for objects or channel position information for channels that have been transmitted using SAOC.

However, if only a specific output interface is necessitated then the VBAP state 1810 can already provide the necessitated rendering matrix for the e.g., 5.1 output. The SAOC decoder 1800 then performs a direct rendering from the SAOC transport channels, the associated parametric data and decompressed metadata, a direct rendering into the necessitated output format without any interaction of the mixer 1220. However, when a certain mix between modes is applied, i.e., where several channels are SAOC encoded but not all channels are SAOC encoded or where several objects are SAOC encoded but not all objects are SAOC encoded or when only a certain amount of pre-rendered objects with channels are SAOC decoded and remaining channels are not SAOC processed then the mixer will put together the data from the individual input portions, i.e., directly from the core decoder 1300, from the object renderer 1210 and from the SAOC decoder 1800.

In FIG. 15, the OAM-Decoder 1400 is the metadata decoder 110 of an apparatus 100 for generating one or more audio channels according to one of the above-described embodiments. Moreover, in FIG. 15, the Object Renderer 1210, the USAC decoder 1300 and the mixer 1220 together form the audio decoder 120 of an apparatus 100 for generating one or more audio channels according to one of the above-described embodiments.

An apparatus for decoding encoded audio data is provided. The apparatus for decoding encoded audio data comprises:

an input interface 1100 for receiving the encoded audio data, the encoded audio data comprising a plurality of encoded channels or a plurality of encoded objects or compress metadata related to the plurality of objects, and an apparatus 100 comprising a metadata decoder 110 and an audio channel generator 120 for generating one or more audio channels as described above.

The metadata decoder 110 of the apparatus 100 for generating one or more audio channels is a metadata decompressor 400 for decompressing the compressed metadata.

The audio channel generator 120 of the apparatus 100 for generating one or more audio channels comprises a core decoder 1300 for decoding the plurality of encoded channels and the plurality of encoded objects.

Moreover, the audio channel generator 120 further comprises an object processor 1200 for processing the plurality of decoded objects using the decompressed metadata to obtain a number of output channels 1205 comprising audio data from the objects and the decoded channels.

Furthermore, the audio channel generator 120 further comprises a post processor 1700 for converting the number of output channels 1205 into an output format.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Peters, N., Lossius, T. and Schacher J. C., "SpatDIF: Principles, Specification, and Examples", 9th Sound and Music Computing Conference, Copenhagen, Denmark, July 2012.

[2] Wright, M., Freed, A., "Open Sound Control: A New Protocol for Communicating with Sound Synthesizers", International Computer Music Conference, Thessaloniki, Greece, 1997.

[3] Matthias Geier, Jens Ahrens, and Sascha Spors. (2010), "Object-based audio reproduction and the audio scene description format", Org. Sound, Vol. 15, No. 3, pp. 219-227, December 2010.

[4] W3C, "Synchronized Multimedia Integration Language (SMIL 3.0)", December 2008.

[5] W3C, "Extensible Markup Language (XML) 1.0 (Fifth Edition)", November 2008.

[6] MPEG, "ISO/IEC International Standard 14496-3—Coding of audio-visual objects, Part 3 Audio", 2009.

[7] Schmidt, J.; Schroeder, E. F. (2004), "New and Advanced Features for Audio Presentation in the MPEG-4 Standard", 116th AES Convention, Berlin, Germany, May 2004

[8] Web3D, "International Standard ISO/IEC 14772-1: 1997—The Virtual Reality Modeling Language (VRML), Part 1: Functional specification and UTF-8 encoding", 1997.

[9] Sporer, T. (2012), "Codierung räumlicher Audiosignale mit leichtgewichtigen Audio-Objekten", Proc. Annual Meeting of the German Audiological Society (DGA), Erlangen, Germany, March 2012.

[10] Cutler, C. C. (1950), "Differential Quantization of Communication Signals", U.S. Pat. No. 2,605,361, July 1952.

[11] Ville Pulkki, "Virtual Sound Source Positioning Using Vector Base Amplitude Panning"; J. Audio Eng. Soc., Volume 45, Issue 6, pp. 456-466, June 1997.

The invention claimed is:

1. An apparatus for generating one or more audio channels, wherein the apparatus comprises:

a metadata decoder for generating one or more reconstructed metadata signals from one or more processed metadata signals depending on a control signal, wherein each of the one or more reconstructed metadata signals indicates information associated with an audio signal of one or more audio signals, wherein the metadata decoder is configured to generate the one or more reconstructed metadata signals by determining a plurality of reconstructed metadata samples for each of the one or more reconstructed metadata signals, and an audio channel generator for generating the one or more audio channels depending on the one or more audio signals and depending on the one or more reconstructed metadata signals, wherein the metadata decoder is configured to receive a plurality of processed metadata samples of each of the one or more processed metadata signals, wherein the metadata decoder is configured to receive the control signal, wherein the metadata decoder is configured to determine each reconstructed metadata sample of the plurality of reconstructed metadata samples of each reconstructed metadata signal of the one or more reconstructed metadata signals, so that, when the control signal indicates a first state, said reconstructed metadata sample is a sum of one of the processed metadata samples of one of the one or more processed metadata signals and of another already generated reconstructed metadata sample of said reconstructed metadata signal, and so that, when the control signal indicates a second state being different from the first state, said reconstructed metadata sample is said one of the processed metadata samples of said one of the one or more processed metadata signals.

2. An apparatus according to claim 1, wherein the metadata decoder is configured to receive two or more of the processed metadata signals, and is configured to generate two or more of the reconstructed metadata signals, wherein the metadata decoder comprises two or more metadata decoder subunits, wherein each of the two or more metadata decoder subunits comprises an adder and a selector, wherein each of the two or more metadata decoder subunits is configured to receive the plurality of processed metadata samples of one of the two or more processed metadata signals, and is configured to generate one of the two or more reconstructed metadata signals, wherein the adder of said metadata decoder subunit is configured to add one of the processed metadata samples of said one of the two or more processed metadata signals and another already generated reconstructed metadata sample of said one of the two or more reconstructed metadata signals, to acquire a sum value, and wherein the selector of said metadata decoder subunit is configured to receive said one of the processed metadata samples, said sum value and the control signal, and wherein said selector is configured to determine one of the plurality of metadata samples of said reconstructed metadata signal so that, when the control signal indicates the first state, said reconstructed metadata sample is the sum value, and so that, when the control signal indicates the second state, said reconstructed metadata sample is said one of the processed metadata samples.

3. An apparatus according to claim 1, wherein at least one of the one or more reconstructed metadata signals indicates position information on one of the one or more audio signals, and wherein the audio channel generator is configured to generate at least one of the one or more audio channels depending on said one of the one or more audio signals and depending on said position information.

4. An apparatus according to claim 1, wherein at least one of the one or more reconstructed metadata signals indicates a volume of one of the one or more audio signals, and wherein the audio channel generator is configured to generate at least one of the one or more audio channels depending on said one of the one or more audio signals and depending on said volume.

5. An apparatus for generating encoded audio information comprising one or more encoded audio signals and one or more processed metadata signals, wherein the apparatus comprises:

a metadata encoder for receiving one or more original metadata signals and for determining the one or more processed metadata signals, wherein each of the one or more original metadata signals comprises a plurality of original metadata samples, wherein the original metadata samples of each of the one or more original metadata signals indicate information associated with an audio signal of one or more audio signals, and an audio encoder for encoding the one or more audio signals to acquire the one or more encoded audio signals, wherein the metadata encoder is configured to determine each processed metadata sample of a plurality of processed metadata samples of each processed metadata signal of the one or more processed metadata signals, so that, when a control signal indicates a first state, said processed metadata sample indicates a difference or a quantized difference between one of the plurality of original metadata samples of one of the one or more original metadata signals and of another already generated processed metadata sample of said processed metadata signal, and so that, when the control signal indicates a second state being different from the first state, said processed metadata sample is said one of the original metadata samples of said one of the one or more original metadata signals, or is a quantized representation said one of the original metadata samples.

6. An apparatus according to claim 5, wherein the metadata encoder is configured to receive two or more of the original metadata signals, and is configured to generate two or more of the processed metadata signals, wherein the metadata encoder comprises two or more Differential Pulse Code Modulation (DPCM) Encoders, wherein each of the two or more DPCM Encoders is configured to determine a difference or a quantized difference between one of the original metadata samples of one of the two or more original metadata signals and another already generated processed metadata sample of one of the two or more processed metadata signals, to acquire a difference sample, and wherein metadata encoder further comprises a selector being configured to determine one of the plurality of processed metadata samples of said processed metadata signal so that, when the control signal indicates the first state, said processed metadata sample is the difference sample, and so that, when the control signal indicates the second state, said processed metadata sample is said one of the original metadata samples or a quantized representation of said one of the original metadata samples.

7. An apparatus according to claim 5, wherein at least one of the one or more original metadata signals indicates position information on one of the one or more audio signals, and wherein the metadata encoder is configured to generate at least one of the one or more processed metadata signals depending on said at least one of the one or more original metadata signals which indicates said position information.

8. An apparatus according to claim 5, wherein at least one of the one or more original metadata signals indicates a volume of one of the one or more audio signals, and wherein the metadata encoder is configured to generate at least one of the one or more processed metadata signals depending on said at least one of the one or more original metadata signals which indicates said volume.

9. An apparatus according to claim 5, wherein the metadata encoder is configured to encode each of the processed metadata samples of one of the one or more processed metadata signals with a first number of bits when the control signal indicates the first state, and with a second number of bits when the control signal indicates the second state, wherein the first number of bits is smaller than the second number of bits.

10. A system, comprising:

an apparatus according to claim 5 for generating encoded audio information comprising one or more encoded audio signals and one or more processed metadata signals, and an apparatus according to claim 1 for receiving the one or more encoded audio signals and the one or more processed metadata signals, and for generating one or more audio channels depending on the one or more encoded audio signals and depending on the one or more processed metadata signals.

11. A method for generating one or more audio channels, wherein the method comprises:

generating one or more reconstructed metadata signals from one or more processed metadata signals depending on a control signal, wherein each of the one or more reconstructed metadata signals indicates information associated with an audio signal of one or more audio signals, wherein generating the one or more reconstructed metadata signals is conducted by determining a plurality of reconstructed metadata samples for each of the one or more reconstructed metadata signals, and generating the one or more audio channels depending on the one or more audio signals and depending on the one or more reconstructed metadata signals, wherein generating the one or more reconstructed metadata signals is conducted by receiving a plurality of processed metadata samples of each of the one or more processed metadata signals, by receiving the control signal, and by determining each reconstructed metadata sample of the plurality of reconstructed metadata samples of each reconstructed metadata signal of the one or more reconstructed metadata signals, so that, when the control signal indicates a first state, said reconstructed metadata sample is a sum of one of the processed metadata samples of one of the one or more processed metadata signals and of another already generated reconstructed metadata sample of said reconstructed metadata signal, and so that, when the control signal indicates a second state being different from the first state, said reconstructed metadata sample is said one of the processed metadata samples of said one of the one or more processed metadata signals.

12. A method for generating encoded audio information comprising one or more encoded audio signals and one or more processed metadata signals, wherein the method comprises:

receiving one or more original metadata signals, determining the one or more processed metadata signals, and encoding one or more audio signals to acquire the one or more encoded audio signals, wherein each of the one or more original metadata signals comprises a plurality of original metadata samples, wherein the original metadata samples of each of the one or more original metadata signals indicate information associated with an audio signal of the one or more audio signals, and wherein determining the one or more processed metadata signals comprises determining each processed metadata sample of a plurality of processed metadata samples of each processed metadata signal of the one or more processed metadata signals, so that, when a control signal indicates a first state, said processed metadata sample indicates a difference or a quantized difference between one of the plurality of original metadata samples of one of the one or more original metadata signals and of another already generated processed metadata sample of said processed metadata signal, and so that, when the control signal indicates a second state being different from the first state, said processed metadata sample is said one of the original metadata samples of said one of the one or more original metadata signals, or is a quantized representation said one of the original metadata samples.

13. Non-transitory digital storage medium having a computer program stored thereon to perform a method for generating one or more audio channels, wherein the method comprises:

generating one or more reconstructed metadata signals from one or more processed metadata signals depending on a control signal, wherein each of the one or more reconstructed metadata signals indicates information associated with an audio signal of one or more audio signals, wherein generating the one or more reconstructed metadata signals is conducted by determining a plurality of reconstructed metadata samples for each of the one or more reconstructed metadata signals, and generating the one or more audio channels depending on the one or more audio signals and depending on the one or more reconstructed metadata signals, wherein generating the one or more reconstructed metadata signals is conducted by receiving a plurality of processed metadata samples of each of the one or more processed metadata signals, by receiving the control signal, and by determining each reconstructed metadata sample of the plurality of reconstructed metadata samples of each reconstructed metadata signal of the one or more reconstructed metadata signals, so that, when the control signal indicates a first state, said reconstructed metadata sample is a sum of one of the processed metadata samples of one of the one or more processed metadata signals and of another already generated reconstructed metadata sample of said reconstructed metadata signal, and so that, when the control signal indicates a second state being different from the first state, said reconstructed metadata sample is said one of the processed metadata samples of said one of the one or more processed metadata signals, when said computer program is run by a computer.

14. Non-transitory digital storage medium having a computer program stored thereon to perform a method for generating encoded audio information comprising one or more encoded audio signals and one or more processed metadata signals, wherein the method comprises:

receiving one or more original metadata signals, determining the one or more processed metadata signals, and encoding one or more audio signals to acquire the one or more encoded audio signals, wherein each of the one or more original metadata signals comprises a plurality of original metadata samples, wherein the original metadata samples of each of the one or more original metadata signals indicate information associated with an audio signal of the one or more audio signals, and wherein determining the one or more processed metadata signals comprises determining each processed metadata sample of a plurality of processed metadata samples of each processed metadata signal of the one or more processed metadata signals, so that, when a control signal indicates a first state, said processed metadata sample indicates a difference or a quantized difference between one of the plurality of original metadata samples of one of the one or more original metadata signals and of another already generated processed metadata sample of said processed metadata signal, and so that, when the control signal indicates a second state being different from the first state, said processed metadata sample is said one of the original metadata samples of said one of the one or more original metadata signals, or is a quantized representation said one of the original metadata samples, when said computer program is run by a computer.

* * * * *